United States Patent [19]

Tamura et al.

[11] Patent Number: 4,523,084
[45] Date of Patent: Jun. 11, 1985

[54] CONTROLLER FOR RESISTIVE HEATING ELEMENT

[75] Inventors: Paul S. Tamura, Palo Alto; Robert J. Strehlow, Mt. View, both of Calif.

[73] Assignee: Oximetrix, Inc., Mountain View, Calif.

[21] Appl. No.: 298,796

[22] Filed: Sep. 2, 1981

[51] Int. Cl.³ .............................................. H05B 1/02
[52] U.S. Cl. .................................. 219/497; 219/501; 219/509; 219/506; 364/482; 307/117
[58] Field of Search ............... 219/494, 506, 497, 499, 219/490, 501, 507–509; 307/117, 310; 364/482, 483

[56] References Cited

U.S. PATENT DOCUMENTS

| | | | |
|---|---|---|---|
| 3,752,956 | 8/1973 | Cahill et al. | 219/497 |
| 3,789,190 | 1/1974 | Orosy et al. | 219/497 |
| 4,267,434 | 5/1981 | Simpson | 219/497 |
| 4,281,386 | 7/1981 | Kondow et al. | 364/482 |
| 4,323,763 | 4/1982 | Goldsmith | 219/497 |
| 4,363,957 | 12/1982 | Tachikawa et al. | 219/497 |

FOREIGN PATENT DOCUMENTS

| | | | |
|---|---|---|---|
| 1104719 | 2/1968 | United Kingdom | 219/497 |
| 1184543 | 3/1970 | United Kingdom | 219/497 |
| 1210432 | 10/1970 | United Kingdom | 219/497 |
| 1330234 | 9/1973 | United Kingdom | 219/497 |
| 1573679 | 8/1980 | United Kingdom | 219/497 |

*Primary Examiner*—M. H. Paschall
*Attorney, Agent, or Firm*—Lyon & Lyon

[57] ABSTRACT

The controller of the present invention regulates the flow of current through a resistive heating element by computing the predicted resistance $R_{hot}$ of the heating element at the desired temperature and then adjusting the voltage drop across and current flow through the resistive heating element until the relationship $V=IR_{hot}$ is satisfied. In an analog embodiment of the present invention, measurement of the voltage drop is obtained from a voltage amplifying circuit connected across the resistive heating element, while a measure of the current flow through the resistive heating element is obtained from a current amplifying circuit connected across a current measuring resistor in series with the resistive heating element. The output of the current amplifying circuit is multiplied by first and second variable gain amplifier circuits to produce a signal output representing the product of the current flow and the predicted resistance at the desired temperature. The signal from the voltage amplifying circuit and the product-representative signal from the two variable gain amplifier circuits are balanced in a control amplifier to produce a control signal having a value which varies as a function of the difference between the voltage-representative signal and the product-representative signal. The control signal is thereafter utilized to adjust the voltage drop across the resistive heating element until the current through the resistive heating element multiplied by the predicted resistance at the desired temperature, i.e., the product-representative signal, equals the voltage drop across the resistive heating element.

16 Claims, 11 Drawing Figures

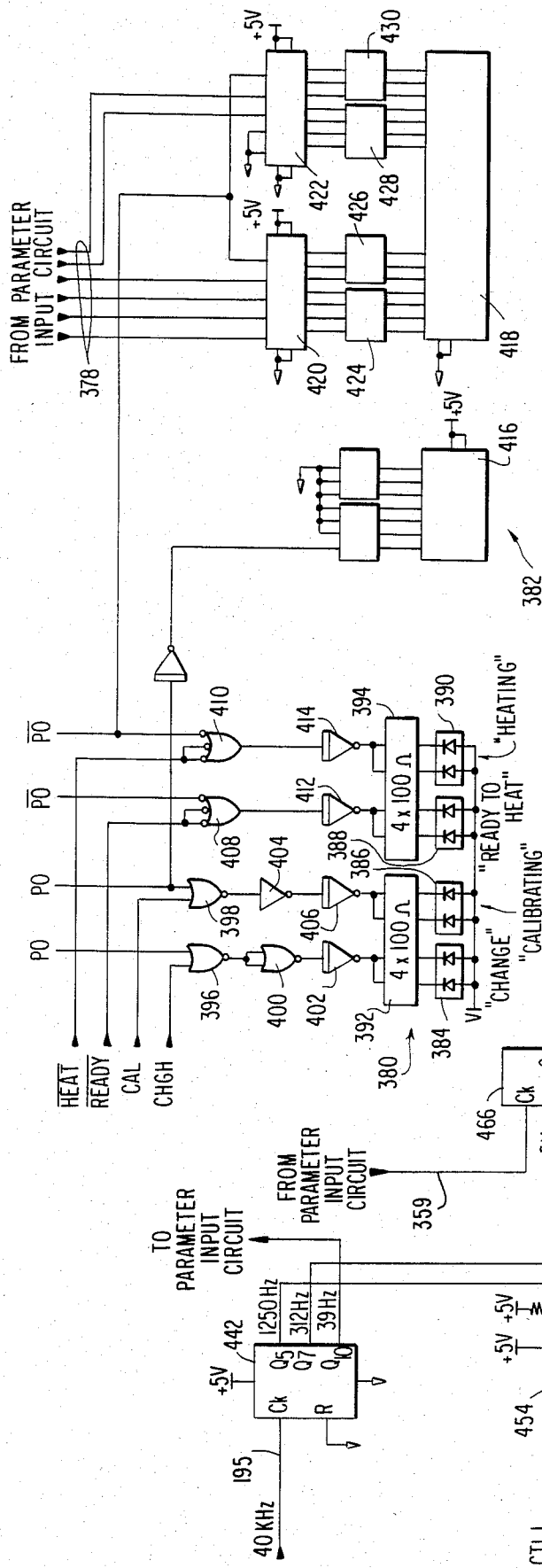
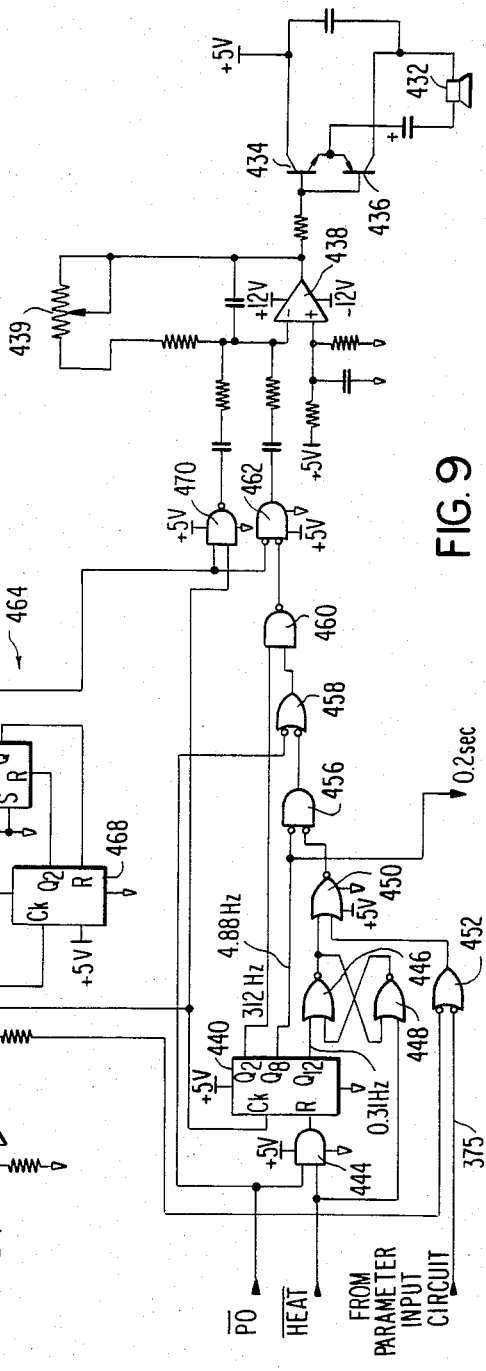
FIG. 8
FIG. 9

CONTROLLER FOR RESISTIVE HEATING ELEMENT

TECHNICAL FIELD

The present invention is directed to a controller which heats a resistive heating element to a desired temperature and more particularly to a controller which regulates the flow of current through the resistive heating element in accordance with the relationship between the voltage drop across the resistive heating element, the current flow through the resistive heating element, and the predicted resistance of the heating element at the predetermined temperature.

BACKGROUND ART

Resistive heating elements provide a simple and economically practical means for generating heat in a wide variety of situations. For example, devices as diverse as those employed in the home appliance field, the industrial equipment field and the medical/surgical instrument field all utilize resistive heating elements to achieve or maintain desired temperatures under varying conditions. In some applications, such as home heating systems, relatively gross temperature control over the resistive heating element is sufficient to satisfy temperature demands. Other applications, such as those involving the use of hemostatic scalpel blades during surgical operations, require precise control over the temperature of the resistive heating element involved. The advantages and benefits, then, in constructing an apparatus capable of exercising fine temperature control over a resistive heating element are evident.

DISCLOSURE OF THE INVENTION

It is therefore an object of the present invention to provide a controller for a resistive heating element.

It is another object of the present invention to provide a controller for a resistive heating element wherein the amount of current flowing through the resistive heating element is precisely regulated to govern the temperature of the resistive heating element.

It is yet another object of the present invention to provide a controller for heating a resistive heating element to a desired temperature wherein the controller predicts the resistance of the heating element at the desired temperature.

It is a further object of the present invention to provide a controller for heating a resistive heating element to a desired temperature wherein a sensing current is coupled across the resistive heating element and used to determine the heating element resistance at ambient or room temperature, the predicted resistance of the heating element at the desired temperature thereafter being determined by multiplying the ambient resistance with a parameter which varies as a function of the desired temperature.

It is still a further object of the present invention to provide a controller for heating a resistance element to a desired temperature wherein the controller measures both current flow through and voltage drop across the resistive heating element and thereafter combines the measured values of the current flow and voltage drop with a predicted value of the heating element resistance at the desired temperature in order to derive a control signal having a value which varies as a function of the difference between the measured voltage drop and the product of the measured current flow and the predicted resistance, the control signal thereafter being used to regulate the flow of current through the resistive heating element.

It is an additional object of the present invention to provide an analog controller circuit for heating a resistive heating element to a desired temperature, which analog controller circuit multiplies the measured value of current flow through the heating element by both a first variable gain factor representing the resistance of the heating element at an ambient temperature and a second variable gain factor representing a parameter dependent upon the desired temperature to yield a signal proportional to the product of the current flow through the heating element and the predicted resistance of the heating element at the desired temperature.

It is yet an additional object of the present invention to provide an analog controller circuit for heating a resistive heating element to a desired temperature wherein a signal representing the voltage drop across the resistive heating element is compared to a signal representing the product of the current flow through the heating element and the predicted resistance of the heating element at the desired temperature in order to derive a control signal having a value dependent upon the difference between the voltage-representative signal and the product-representative signal, the control signal thereafter being employed to gate the flow of current from a current source through the resistive heating element such that the resistive heating element is brought to the desired temperature.

These and other objects of the present invention are achieved by a controller which regulates the flow of current through the resistive heating element by computing the predicted resistance $R_{hot}$ of the heating element at the desired temperature and then adjusting the voltage drop across and current flow through the resistive heating element until the relationship $V = IR_{hot}$ is satisfied. In this manner, the controller can achieve the desired heating element temperature by measuring voltage and current without any electrical signal directly proportional to the heating element resistance. One embodiment of the present invention utilizes an analog control loop to vary the voltage across the resistive heating element until the current through the heating element multiplied by the predicted resistance at the desired temperature equals the voltage across the heating element. When the actual heating element resistance is below the predicted resistance, indicating that the heating element is too cool, the voltage across the heating element is too low to provide the current flow necessary for achieving the predicted resistance, and the analog control loop will accordingly increase the voltage, and hence the actual heating element resistance and temperature, in order to satisfy the relationship $V = IR_{hot}$. Where the actual heating element resistance is above the predicted resistance, the control loop will lower the voltage drop across the heating element to decrease the current flow therethrough, again adjusting the voltage drop, the current flow and actual heating element resistance to satisfy the relationship $V = IR_{hot}$. Voltage measurements are obtained from a voltage amplifying circuit connected across the resistive heating element. Current measurements are obtained from a current amplifying circuit connected across a current measuring resistor in series with the resistive heating element. The output of the current amplifying circuit is converted to a current-representative signal in a current-to-voltage converter and supplied to a first variable gain amplifier circuit having a gain factor set during the calibration sequence such that the output of the first variable gain amplifier circuit is proportional to the value of current flowing through the resistive heating element multiplied by the value of the room temperature or ambient resistance. A second variable gain amplifier circuit multiplies the output of the first variable gain amplifier circuit by a gain factor representing a temperature-dependent parameter. The value of the temperature-dependent parameter is programmed into the second variable gain amplifier circuit as a function of the desired temperature. The net result of passing the current-representative signal through both the first and second variable gain amplifier circuits is a signal output representing the product of the current flow and the predicted resistance at the desired temperature. The voltage-representative signal from the voltage amplifying circuit and the product-representative signal from the two variable gain amplifier circuits are then balanced in a control amplifier to produce a control signal having a value which varies as a function of the difference between the voltage-representative signal and the product-representative signal. The control signal is level-shifted to provide for the regulation of current through the resistive heating element over the entire operating voltage range of the controller, and the level-shifted control signal is subsequently supplied to a gating element which performs the current regulating function.

The calibration sequence is accomplished by applying a calibration voltage across the heating element to induce a sensing current therein, whereupon a digital-to-analog converter supplied with the current-representative signal from the current-to-voltage converter is driven by a counter to produce an output having a gain equal to the magnitude of the calibration voltage. The gain factor present in the digital-to-analog converter, which represents the value of the heating element resistance at room or ambient temperature, is locked into the digital-to-analog converter and used to multiply the current-representative signal during the subsequent heating sequences. The sensing current is also imposed on the resistive heating element when the resistive heating element is not being heated in order to determine whether or not the heating element is properly connected to the controller. A limit sensing circuit is employed during both the calibration and heating sequences to detect heating element resistances in excess of predetermined minimum and maximum allowable values.

BRIEF DESCRIPTION OF THE DRAWINGS

The various features, objects and advantages of the present invention will become more apparent from the following Brief Description of the Drawings and Best Mode for Carrying Out the Invention, wherein:

FIG. 8 is a circuit diagram of a display means suitable for use with the FIG. 2 controller; and FIG. 9 is a circuit diagram of an audio section suitable for use with the FIG. 2 controller.

BEST MODE FOR CARRYING OUT THE INVENTION

The simple electrical relationships which exist between the resistance of a resistive heating element and the amount of heat given off by the element in response to current flow therethrough make resistive heating elements particularly attractive from a control standpoint. Basically, the amount of heat given off by any electrical conductor in response to current flow is a function of the resistance of the conductor. Resistance in turn varies as the temperature T of the conductor changes. This relationship between resistance and temperature can be expressed as follows:

$$R(T) = R_{amb} \times (1 + \alpha \Delta T), \qquad (1)$$

where $R_{amb}$ is the resistance of the conductor at ambient temperature, $\alpha$ is a temperature coefficient having a value dependent upon the composition of the conductor and $\Delta T = T - _{amb}$. Using Equation (1), the value of the resistance $R_{hot}$ presented to the flow of current through a given conductor can be predicted for any desired conductor temperature $T_{hot}$. This ability to predict resistance suggests a simple electrical solution to the problem of precise temperature control. Given the elementary electrical relationship between voltage, current and resistance, i.e., $$V = IR \qquad (2)$$

or, alternatively, $$V/I = R \qquad (3)$$

the exact relationship or ratio between voltage drop across a conductor and current flow through the conductor can be ascertained for the desired temperature $T_{hot}$. That is, in order to bring the temperature of the conductor to $T_{hot}$, the ratio of voltage to current in the conductor must equal $R_{hot}$:

$$V_{(at\ Thot)}/I_{(at\ Thot)} = R_{hot} \qquad (4)$$

It then remains for the controller to adjust the voltage drop, and hence the current flow, with regard to the conductor until the ascertained or predicted ratio is obtained.

Figure 1:
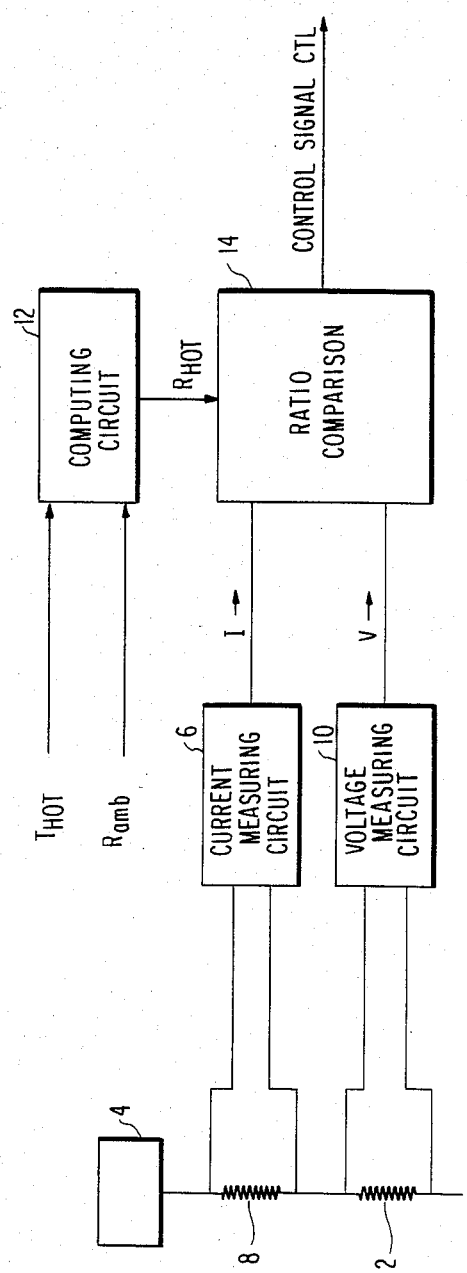
FIG. 1 is a schematic illustration depicting the fundamental operations of a controller constructed in accordance with the present invention.

A system for implementing a controller based on the electrical relationships set forth in Equations (1)–(4) above is schematically illustrated in FIG. 1. A resistive heating element 2 is connected to receive current from a current source 4 such that the flow of current through resistive heating element 2 generates heat. A current measuring circuit 6 measures the amount of current flow, using a current-measuring resistor 8 serially connected between resistive heating element 2 and current source 4. The output signal of current measuring circuit 6 represents the amount of current so measured. Voltage measuring circuit 10 similarly measures the voltage drop directly across resistive heating element 2 and outputs a signal representing the magnitude of the voltage so measured. Resistance computing circuit 12 provides an output representing the predicted value of the heating element resistance $R_{hot}$ at the temperature $T_{hot}$ to which the heating element will be controlled. The magnitude of $T_{hot}$ and the value of the heating element resistance $R_{amb}$ at ambient or room temperature are entered into resistance computing circuit 12 to enable the computation of $R_{hot}$ using Equation (1) above. If desired, the value of $R_{amb}$ can be determined during an initial calibration sequence by applying a reference voltage across the resistive heating element to produce a flow of sensing current thereacross and then comparing the value of the reference voltage with the measured value of the sensing current in accordance with either Equations (2) or (3) above to arrive at the value of $R_{amb}$. The current-representative signal from current measuring circuit 6, the voltage-representative signal from voltage measuring circuit 10 and the predicted resistance-representative signal from resistance computing circuit 12 are processed in ratio comparison circuit 14 to generate a control signal CTL having a value determined by the difference between the value of the voltage-representative signal and the product of the current-representative signal and the computed resistance signal. Control signal CTL may be used to gate the flow of current from current source 4 through resistive heating element 2, thus regulating the current flow until the measured values of current and voltage satisfy either Equations (2) or (3) above for the computed resistance $R_{hot}$. Any appropriate means for implementing the current and voltage measurements, the predicted resistance computations and the ratio comparison may be employed, including software techniques, hardware techniques or mixed software and hardware techniques.

Figure 2:
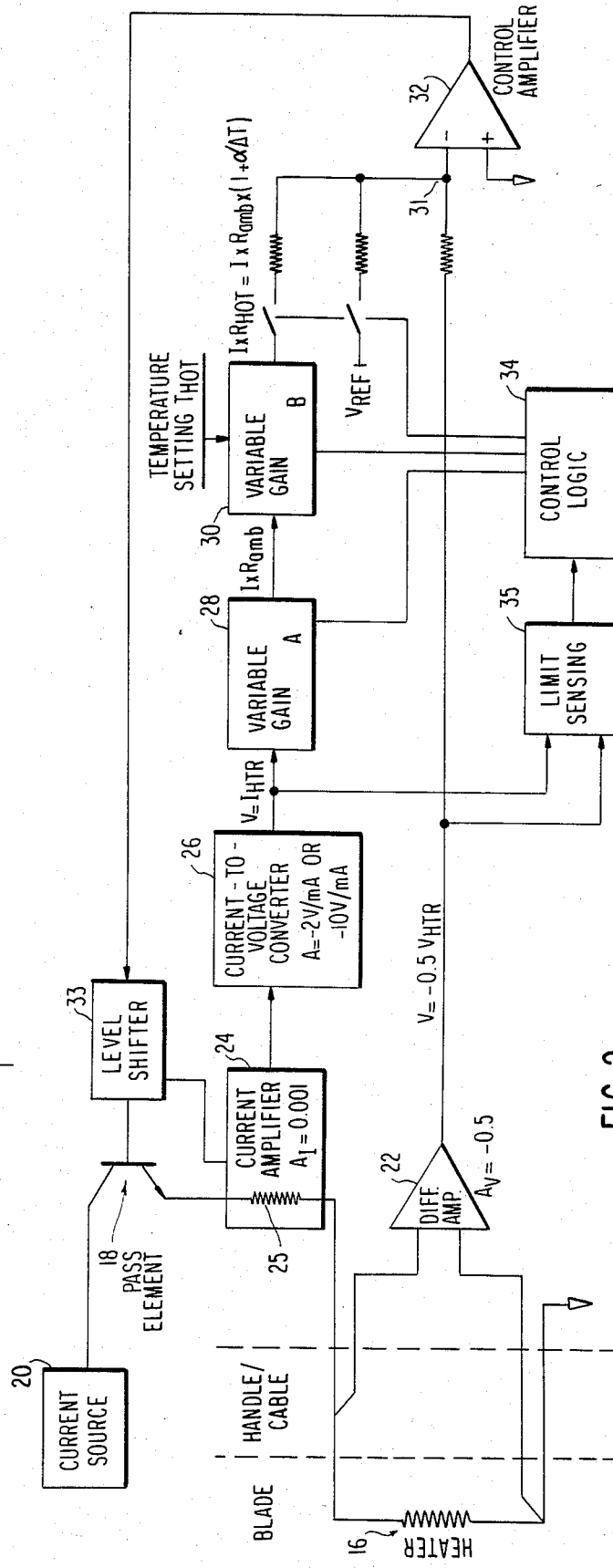
FIG. 2 is a block diagram of an analog version of the controller disclosed in FIG. 1.

FIG. 2 schematically illustrates an analog version of the present invention. A resistive heating element 16 is connected through a pass or gate element 18 to receive operating current from a current source 20. Voltage drop across the resistive heating element is measured by a suitably connected voltage amplifying circuit 22. The voltage amplifying circuit outputs a voltage-representative signal $V_{HTR}$ having an absolute value proportional to the magnitude of the voltage drop. $V_{HTR}$ may be either positive or negative in polarity, but in the preferred embodiment is negative. A current amplifier 24 including a current measuring resistor 25 is connected between the gate element 18 and the resistive heating element 16 to measure the magnitude of current flowing through the resistive heating element. The output from current amplifier 24 is supplied to a current-to-voltage converter 26 to generate a current-representative signal $I_{HTR}$ having an absolute value proportional to the magnitude of current flowing through resistive heating element 16. Current-representative signal $I_{HTR}$ is thereafter passed through two variable gain amplifier circuits 28 and 30, the first of which variable gain amplifier circuits 28 operates to multiply the current-representative signal by a gain factor equal to the resistive heating element ambient or room temperature resistance $R_{amb}$. $R_{amb}$ is computed during the calibration process, as will be described in greater detail hereinbelow. The second variable gain amplifier circuit 30 operates to multiply the output of first variable gain amplifier circuit 28 by a gain factor equal to the temperature parameter $(1 + \alpha \Delta T)$. Thus, in keeping with Equation (1) above, the net output of the two variable gain amplifier circuits is a product signal having a value equal to the magnitude of the current flow through the resistive heating element multiplied by the value of the predicted heating element resistance $R_{hot}$ at the desired temperature. The gain factors of the variable gain amplifier circuits are set such that the polarity of the product signal is opposite to that of $V_{HTR}$. Where $V_{HTR}$ is negative, of course, the product signal is positive.

The net output or product signal from variable gain amplifier circuits 28 and 30 is applied to a summing junction 31 connected to one input of a control amplifier 32. The other input to summing junction 31 is supplied by the voltage-representative signal $V_{HTR}$ from voltage amplifying circuit 22. It can accordingly be seen that control amplifier 32 together with summing junction 31 serves as a ratio-taking means, outputting a control signal CTL which varies as a function of the difference between the voltage-representative signal $V_{HTR}$ and the product of the current-representative signal $I_{HTR}$ and the calculated value of the resistance $R_{hot}$ at the desired temperature. Control signal CTL thereafter energizes gate element 18 to regulate the flow of current from current source 20 to heating element 16. A level-shifting circuit 33 interposed between control amplifier 32 and gate element 18 adjusts the operating voltage range of the controller. A logic circuit 34 governs the overall operation of the controller and in particular initiates the calibrating sequence used to arrive at the gain factor $R_{amb}$ of variable gain circuit 28. A limit sensing circuit 35 connected to receive both the current-representative signal $I_{HTR}$ and the voltage-representative signal $V_{HTR}$ continuously measures the heating element voltage against the heating element current multiplied by both predetermined minimum and maximum values, to provide logic circuit 34 with an indication that the resistance of heating element 16 is within an allowable range.

Figure 3:
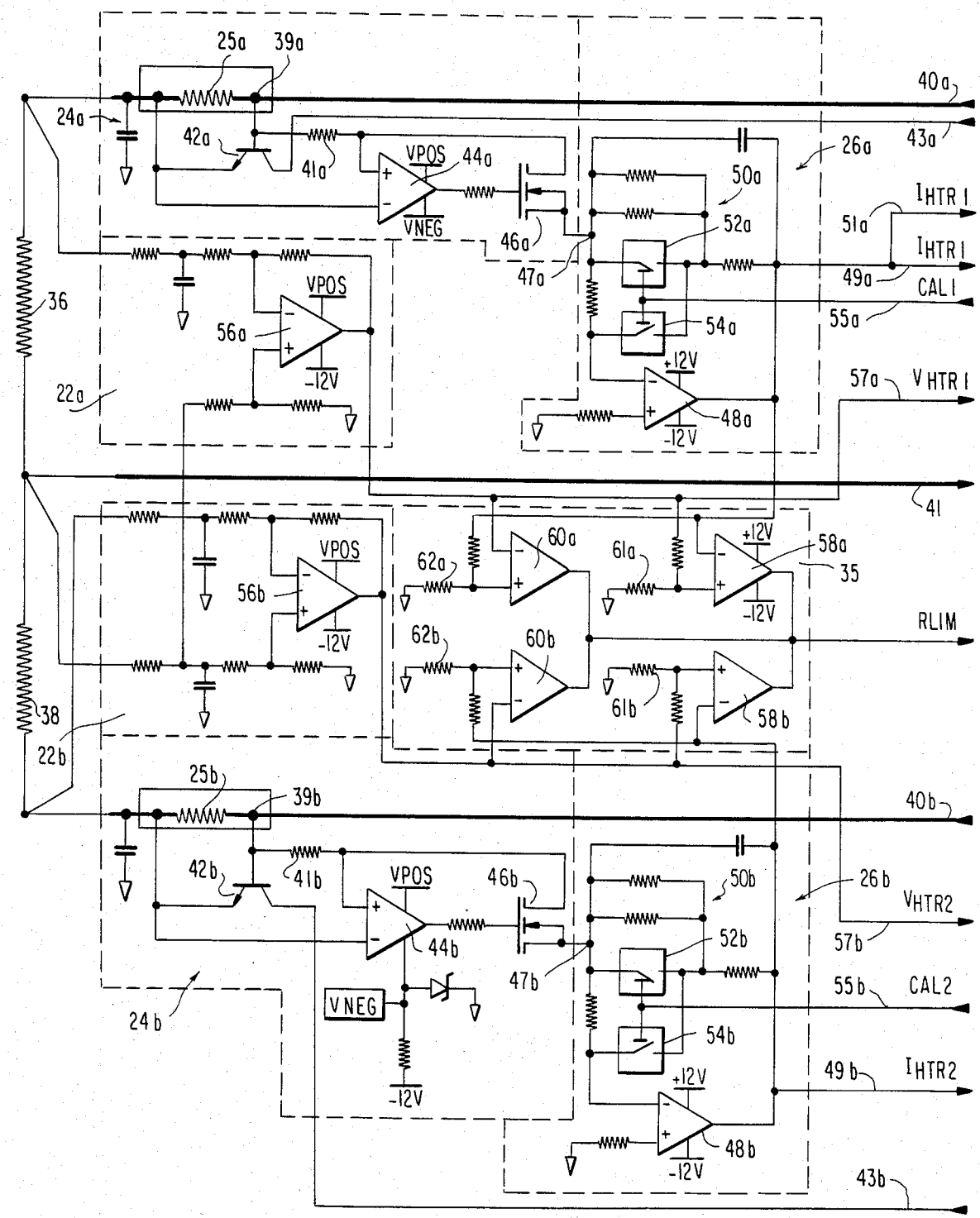
FIG. 3 is a circuit diagram of the current and voltage measuring sections of the controller disclosed in FIG. 2.

A detailed circuit diagram of one form of analog controller constructed in accordance with the present invention is illustrated in FIGS. 3-8. The embodiment of FIGS. 3-8 is specifically suited for use with a heating apparatus having dual, series-connected resistive heating elements. If desired, each of the resistive heating elements may be of the type employed with the surgical scalpel disclosed in U.S. patent application Ser. No. 201,603 filed Oct. 28, 1980 and assigned to the assignee of the present invention. Turning first to FIG. 3, the dual heating element configuration including resistive heating elements 36 and 38 can be seen. The controller circuitry for regulating the flow of current through each resistive heating element is structurally and functionally identical. Hence, the designators "a" and "b" are used to distinguish between like elements of the circuitry associated with each resistive heating element. As an aid to convenience, those elements associated with resistive heating element 36 will be described in detail while elements associated with resistive heating element 38 will most often be referred to in general terms only, but it is again emphasized that the manner in which current flow through resistive heating element 38 is regulated corresponds precisely to the manner in which current flow through resistive heating element 36 is regulated. Current is directed from the current source (not shown in FIG. 3) to the resistive heating elements 36 and 38 via main leads 40a and 40b. Return lead 41 furnishes a current path back to the current source. Focusing on the controller circuitry associated with resistive heating element 36, it can be seen that current measuring resistor 25a of current amplifier 24a forms part of the input circuit to linear differential amplifier 44a. More particularly, current measuring resistor 25a is connected between junction 39a on lead 40a and the negative amplifier input, while a balancing resistor 41a is connected between junction 39a and the positive input of amplifier 44a. Current flowing through lead 40a to resistive heating element 36 causes amplifier 44a to output a signal in an attempt to balance the two amplifier inputs, which signal varies the conductivity of FET device 46a in accordance with changes in the magnitude of current flowing through lead 40a. The resultant output at junction 47a is a suitably amplified signal representing the current flow across resistive heating element 36. The gain factor of amplifier 44a is, of course, a fractional factor determined by taking the ratio of the resistances of the current measuring resistor 25a and the balancing resistor 41a. The base-emitter circuit of an n-p-n transistor 42a may also be connected across current measuring resistor 25a to provide a current limiting function. When the voltage drop across current measuring resistor 25a exceeds some predetermined limit, indicating that too much current is being supplied to the resistive heating element 36, n-p-n transistor 42a begins to conduct, pulling current from current source 20 along lead 43a and reducing the current flow through resistive heating element 36 as will be described hereinbelow.

The amplified signal from junction 47a is supplied to the amplifier 48a of current-to-voltage converter 26a. The output of amplifier 48a comprises the aforementioned current-representative signal $I_{HTR1}$ having a voltage proportional to the magnitude of the current flowing through current measuring resistor 25a, and hence across resistive heating element 36. Current-representative signal $I_{HTR1}$ is directed from the current-to-voltage converter 26a along leads 49a and 51a. The precise amount of gain present in the operation of amplifier 48a can be adjusted by switching portions of resistive network 50a into or out of the amplifier feedback circuit. Such switching is accomplished by energizing digital switches 52a and 54a in response to a calibrating signal $CAL_1$ supplied along lead 55a. It is desirable to switch the amplifier gain to compensate for reduced current levels during the calibration sequence. That is, because low magnitude sensing currents are directed across resistive heating element 36 during calibration, an increased gain factor for amplifier 48a ensures accuracy in the measurement and subsequent room temperature resistance calculations performed with the output of current-to-voltage converter 26a. On the other hand, the larger relative magnitudes of the operating currents flowing through resistive heating element 36 permits use of a lower gain factor for generating the current-representative signal output of current-to-voltage converter 26a during the heating sequence.

Voltage amplifying circuit 22a comprises a linear differential amplifier 56a connected across resistive heating element 36 to provide the voltage-representative signal $V_{HTR1}$. Lead 57a carries the voltage-representative signal from the voltage amplifying circuit 22a.

The limit sensing circuit comprises a set of comparators 58a, 58b, and 60a, 60b. The negative inputs to comparators 58a, 58b are respectively tied to the current-representative signal outputs of current-to-voltage converters 26a and 26b, while the positive inputs to comparators 58a and 58b are respectively tied to the voltage-representative signal outputs of voltage amplifying circuits 22a and 22b. Conversely, the negative inputs to comparators 60a, 60b are respectively tied to the voltage-representative signal outputs of voltage amplifying circuits 22a and 22b while the positive inputs to comparators 60a, 60b are respectively tied to the current-representative signal outputs of current-to-voltage converters 26a and 26b. In this manner, the limit sensing circuit measures the ratio of voltage to current associated with each resistive heating element 36 and 38 to provide a limit check on the resistances of the heating elements. Suitably selected resistors 61a, 61b connected to the positive inputs of comparators 58a, 58b serve to set the lower resistance limit for the heating elements, whereas suitably selected resistors 62a, 62b connected to the positive inputs of comparators 60a and 60b serve to set the upper resistance limit. When the resistance of both heating elements 36 and 38 are within the upper and lower limits, comparators 58a, 58b, 60a, and 60b all generate an output RLIM having a high value. If, however, the resistance of either heating element 36 or 38 exceeds either the upper or lower limit, such as can occur when one of the resistive heating elements malfunctions, the comparator outputs switch to a low value to provide an indication of the malfunction.

Figure 4:
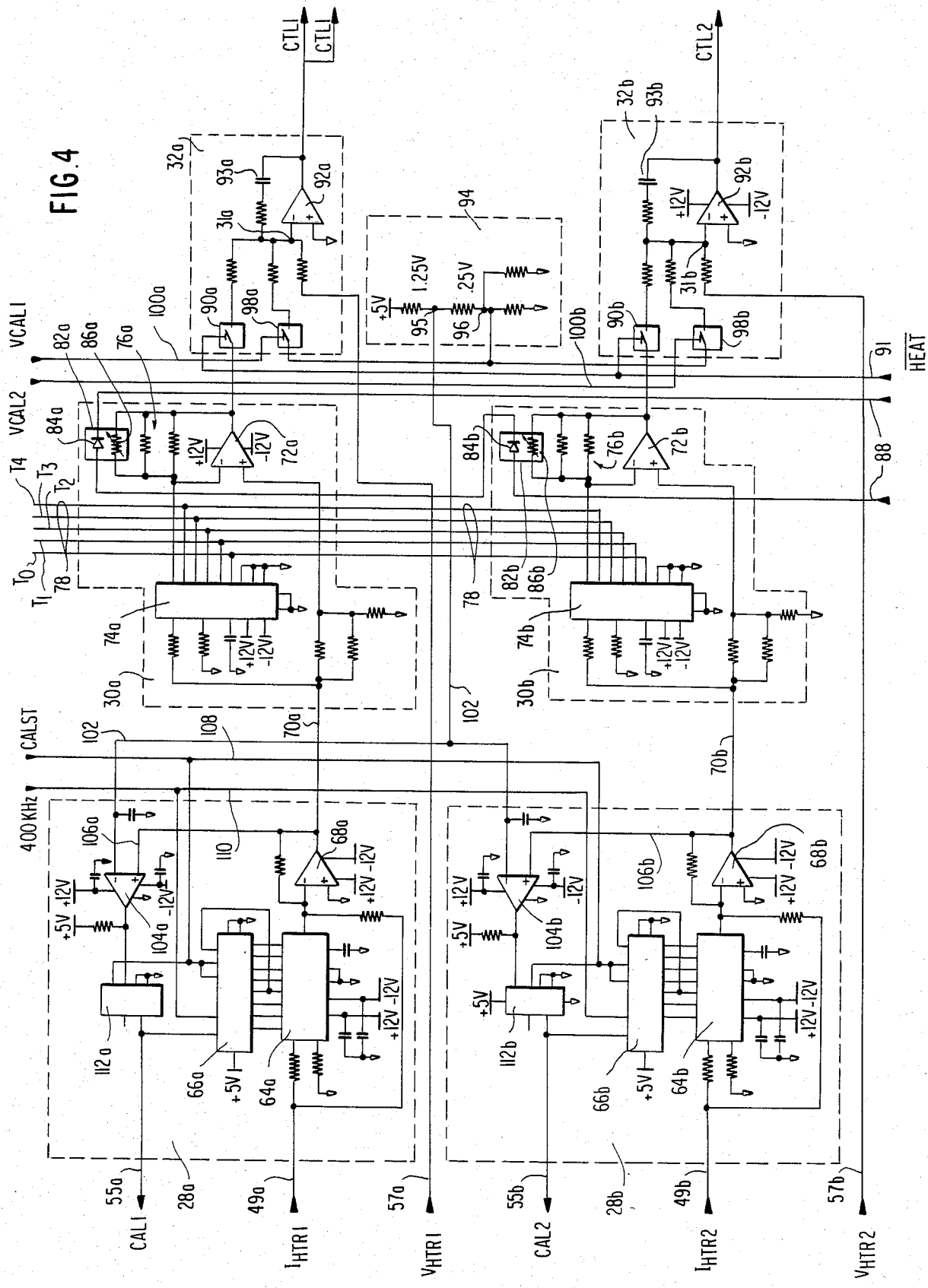
FIG. 4 is a circuit diagram of the resistance computing and current multiplication sections of the FIG. 2 controller.

The variable gain amplifier circuits 28a, 28b, 30a, and 30b and the control amplifiers 32a, 32b respectively associated with resistive heating elements 36 and 38 are illustrated in FIG. 4. Focusing for the sake of convenience on the portion of the circuitry associated with resistive heating element 36, it can be seen that current-representative signal $I_{HTR1}$ is received at variable gain amplifier circuit 28a via lead 49a. Variable gain amplifier circuit 28a includes a digital-to-analog converter 64a which operates to multiply the current-representative signal $I_{HTR1}$ by a gain factor equivalent to the resistance $R_{amb}$ of heating element 36 at room temperature. The value of $R_{amb}$ is supplied to digital-to-analog converter 64a in the form of a digital signal generated by counter 66a. This digital signal is locked into the counter during the calibration process, as will be explained in greater detail hereinbelow. The output from digital-to-analog converter 64a is fed through an amplifier 68a which provides current-to-voltage conversion of the output.

The second variable gain amplifier circuit 30a receives the output from amplifier 68a in the first variable gain amplifier circuit 28a along lead 70a. This output, which as previously indicated represents the product of the current-representative signal $I_{HTR1}$ and the heating element room temperature resistance $R_{amb}$, is supplied to both linear differential amplifier 72a and a second digital-to-analog converter 74a. Digital-to-analog converter 74a functions as a variable resistor in the input circuit of amplifier 72a, adjusting the gain of amplifier 72a until the gain equals the value of the temperature-dependent parameter $(1+\alpha\Delta T)$. It will be recalled that $\Delta T$ is the difference between the desired temperature $T_{hot}$ of the resistive heating element 36 and room or ambient temperature $T_{amb}$:

$$\Delta T = T_{hot} - T_{amb} \qquad (5)$$

Where, for example, resistive heating element 36 is employed to heat a surgical scalpel of the type disclosed in the aforementioned application Ser. No. 201,603, a 22° C. value (approximately the temperature of a hospital operating room) may be selected for $T_{amb}$ and preprogrammed into digital-to-analog converter 74a. The temperature-dependent parameter is then set by digital-to-analog converter 74a in response to a binary representation of the desired temperature $T_{hot}$ supplied on leads 78.

The output from amplifier 72a in second variable gain amplifier circuit 30a represents the value of the output from first variable gain amplifier circuit 28a multiplied by a gain factor equal to the temperature parameter $(1+\alpha\Delta T)$. This output may be expressed as:

$$I_{HTR1} \times R_{amb} \times (1+\alpha\Delta T) \tag{6}$$

Substituting Equation (1) in expression (6) above, yields the expression:

$$I_{HTR1} \times R_{hot} \tag{7}$$

It can thus be seen that the output of amplifier 72a is a product signal representing the value of the current $I_{HTR1}$ flowing through resistive heating element 36 multiplied by the predicted value of the resistance $R_{hot}$ at the desired heating element operating temperature of $T_{hot}$.

Note that the resistive feedback network 76a for amplifier 72a includes an optocoupler 82a having an LED 84a optically linked to photoresistor 86a. Optocoupler 82a serves to shunt resistor 86a into resistive feedback network 80a at the beginning of the heating element warm-up sequence, thereby briefly decreasing the gain of amplifier 72a and lowering the apparent value of the product signal $(I_{HTR1}+R_{hot})$. The magnitude of the control signal subsequently generated by sensing the difference between $V_{HTR1}$ and the product signal is in turn lowered to prevent excessive amounts of current from being drawn through the resistive heating element 36 when the heating element is cold. Without such graduated current flow through the cold resistive heating element, rapid thermal expansion during warm-up could damage the resistive heating element. Leads 88 provide a series circuit path between LED 84a in optocoupler 82a, LED 84b in optocoupler 82b associated with resistive heating element 38, and a current source (shown in greater detail FIG. 6) for the purpose of conducting operating current to the optocouplers 82a, 82b.

The exact manner in which the control signals $CTL_1$ and $CTL_2$ are generated for the two resistive heating elements 36, 38 will now be addressed. The product signal from amplifier 72a is connected through a digital switch 90a to summing junction 31a in control amplifier circuit 32a. Digital switch 90a operates in response to a heating control signal $\overline{HEAT}$ on lead 91 from logic circuit 34 to pass the output from amplifier 72a in second variable gain amplifier circuit 30a to the summing junction 31a. Lead 57a carrying the voltage-representative signal $V_{HTR1}$ from the voltage amplifying circuit 22a of FIG. 3 supplies the other input to summing junction 31a. $V_{HTR1}$ has a negative value, while the output from amplifier 72a has a positive value. Thus, the voltage at summing junction 31a represents the difference between the actual voltage drop $V_{HTR1}$ across resistive heating element 36 and the product signal $(I_{HTR1} \times R_{hot})$ at the desired heating element operating temperature. Summing junction 31a is connected to one input of control amplifier 92a, while the other control amplifier input is grounded. Control amplifier 92a is a linear differential amplifier with a capacitor 93a connected in feedback configuration. Hence, control amplifier 92a acts as an integrator, outputting a power control signal $CTL_1$ having a magnitude which varies as a function of the difference between the actual voltage drop cross resistive heating element 36 and the product of the current flow through the resistive heating element and the heating element resistance at the desired operating temperature. Power control signal $CTL_1$ serves to gate the flow of current from current source 20 to resistive heating element 36, as will be described below with reference to FIG. 5A. When a demand for heat is signaled by generating the aforementioned $\overline{HEAT}$ Signal in the controller logic, only a sensing current is present in resistive heating element 36. $V_{HTR1}$ is thus quite small relative to the value of the product signal $(I_{HTR1} \times R_{hot})$ from amplifier 72a. The difference between $V_{HTR1}$ and the product signal is thus relatively large, resulting in a large initial current flow through the resistive heating element (briefly adjusted, of course, by optocoupler system 80a to prevent thermal damage). With increased current flow through the resistive heating element 36, the voltage drop thereacross begins to increase and $CTL_1$ begins to decrease until the voltage-representative signal $V_{HTR1}$ exactly equals the product signal, indicating that the desired temperature of the resistive heating element has been achieved. At this point, the input to amplifier 92a drops to zero but capacitor 93a holds control signal $CTL_1$ at a fixed level to produce a steady-state current flow condition in resistive heating element 36. The steady-state current flow condition serves to maintain the resistive heating element 36 at the desired temperature, compensating for dissipative heat losses between the resistive heating element and the surrounding atmosphere. If, however, resistive heating element 36 begins to cool more rapidly, such as might occur where the resistive heating element is brought into contact with a relatively cool substance, both the temperature and the actual resistance of the heating element will decrease significantly to lower the voltage drop across the heating element. A difference between the voltage-representative signal $V_{HTR1}$ and the product signal representing the value of the predicted resistance $R_{hot}$ multiplied by the actual current flowing through the resistive heating element $I_{HTR1}$ will reappear at summing junction 31a. The output of control amplifier 92a will rise to some larger positive value reflecting the difference at summing junction 31a, whereupon the value of $CTL_1$ will rise to increase current flow through the resistive heating element 36 until the desired temperature is again reached. In a similar fashion, where the desired temperature is reset to a new higher value, the temperature parameter $(1+\alpha\Delta T)$ entered into digital-to-analog converter 74a in variable gain amplifier circuit 30a will increase, generating a new product signal which will differ from the voltage-representative signal $V_{HTR1}$ at summing junction 31a. The output of control amplifier 92a will accordingly rise to adjust the value of $CTL_1$ until the new desired temperature of the resistive heating element 36 is attained. The generation of control signal $CTL_2$ in control amplifier circuit 32b for the purpose of adjusting current through resistive heating element 38, of course, precisely parallels the generation of control signal $CTL_1$ for resistive heating element 36.

The calibrating sequence for the controller of the present invention will now be described in detail with reference to FIG. 4. A calibration voltage supply 94 is connected to a positive 5-volt source of power to provide a 1.25 V reference potential at point 95 and a 0.25 V reference potential at point 96. As will become apparent, the two reference potentials differ by a factor of 5 in order to compensate for the fact that the measured value of current flowing through the resistive heating elements is multiplied by a gain factor of 5 in current-to-voltage converters 26a, 26b of FIG. 3 during calibration. The 0.25 V reference potential at point 96 is connected to digital switches 98a, 98b respectively associated with control amplifier circuits 32a, 32b. Again focusing for the sake of convenience on those circuit components associated with resistive heating element 36, it can be seen that digital switch 98a closes in response to a calibration control signal $VCAL_1$ conducted along lead 100a from logic circuit 34 (not shown in FIG. 4) at the initiation of the calibration sequence. Likewise, digital switch 98b is closed in response to a calibration control signal $VCAL_2$ conducted along lead 100b from logic circuit 34. With digital switch 98a closed, the 0.25 V reference potential from point 96 is supplied to summing junction 31a at the input to control amplifier 92a. As is explained in connection with FIG. 6 below, the $\overline{HEAT}$ signal on lead 91 is not present during the calibration sequence. Hence, digital switch 90a is open to prevent the product signal at the output of variable gain amplifier circuit 30a from reaching summing junction 31a, and the 0.25 reference potential becomes the only potential against which voltage-representative signal $V_{HTR1}$ is compared for calibrating purposes. The $CTL_1$ output from control amplifier 32a will then vary accordingly to gate current through the resistive heating element 36 until the voltage drop thereacross equals 0.25 V.

The current flow through the resistive heating element 36 at 0.25 V potential is relatively small, serving effectively as a sensing current for calibration purposes. The temperature increase in the resistive heating element, and consequently the heat output, produced by the sensing current are minimal and can safely be ignored from a practical standpoint Hence, the value of the heating element resistance indirectly measured using the 0.25 V reference potential and the measured value of the sensing current is essentially the heating element resistance $R_{amb}$. While the voltage comparison at summing junction 31a and the consequent change in the control signal $CTL_1$ magnitude is occurring, the 1.25 V potential at point 95 is supplied via lead 102 to one input of comparator 104a in variable gain amplifier circuit 38a. The other input to comparator 104a is supplied along lead 106a from the output of amplifier 68a. It will be recalled that the output of amplifier 68a is a voltage signal having a magnitude equal to the value of the current flow $I_{HTR1}$ through resistive heating element 36 multiplied by a gain factor programmed into digital-to-analog converter 64a from counter 66a. A calibration signal CALST also generated in logic circuit 34 at the beginning of the calibration sequence travels along lead 108 to initiate counter operation. Thereafter, counter 66a is clocked by a 400 KHz signal on lead 110 to supply a progressively increasing binary count to digital-to-analog converter 64a, whereupon the signal $I_{HTR1}$ on lead 49a from the current-to-voltage converter 26a, which signal represents the magnitude of the sensing current, is multiplied in digital-to-analog converter 64a by a progressively increasing conversion multiplication factor. This conversion multiplication factor continues to increase until the output of amplifier 68a on lead 106a equals the 1.25 V potential from calibration voltage supply 92 on lead 102, whereupon the output $CAL_1$ of comparator 104a switches polarity to drive the Q output of flip-flop 112 low. The low $\overline{Q}$ output stops counter 66a from counting, in the process locking the last-clocked counter binary output in place. The last-clocked counter binary output, of course, represents the value of the heating element resistance $R_{amb}$ at room temperature. At this point, the calibration process is complete and the value of $R_{amb}$ stored for all future controller operations. It will also be recalled that the $\overline{Q}$ output $CAL_1$ of flip-flop 112 travels along lead 55a to switch the gain of amplifier 48a in current-to-voltage converter 26a to its operating level.

Figures 5A, 5B, 5C:
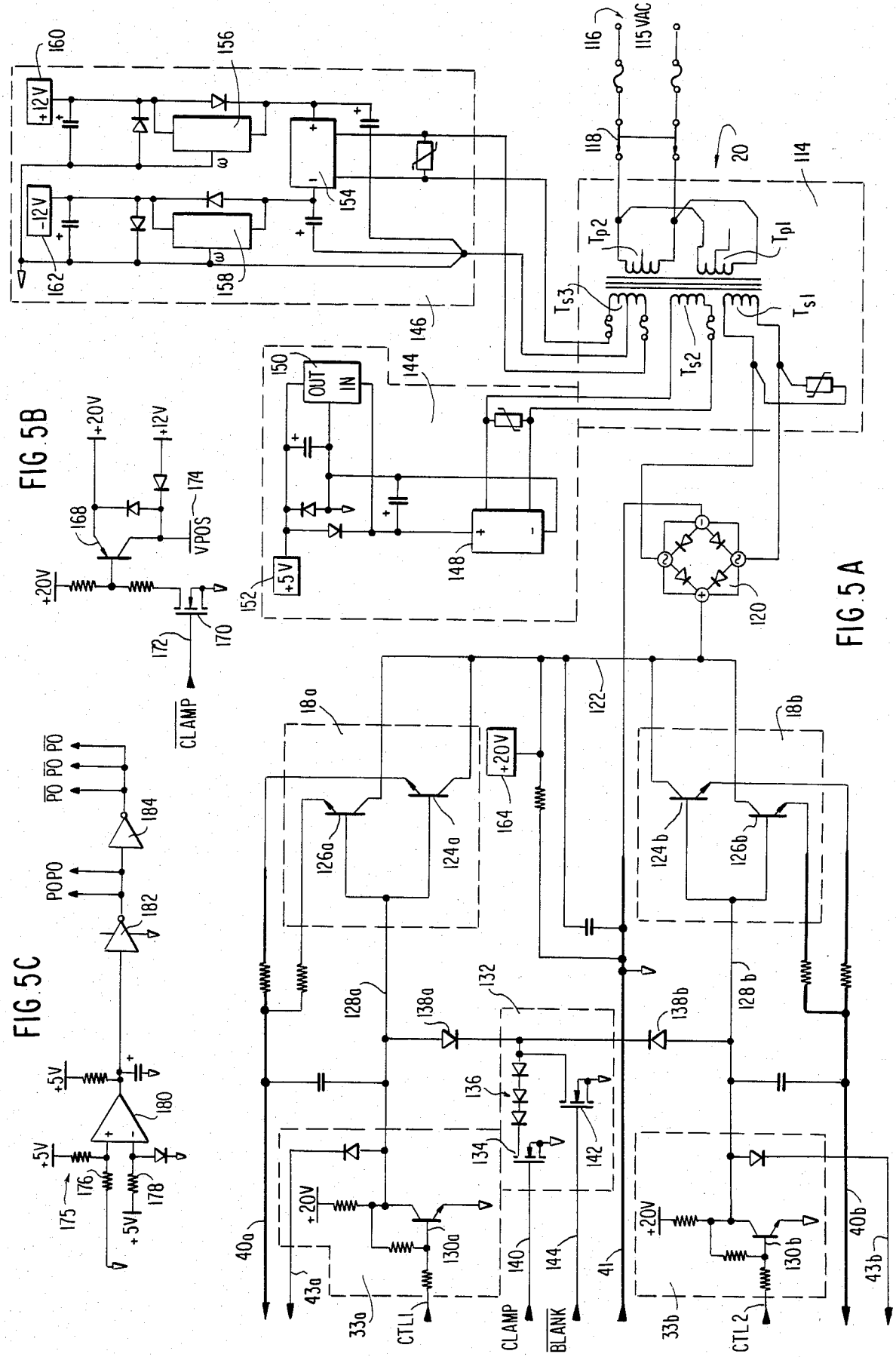
FIGS. 5A–5C are circuit diagrams showing the power section of the FIG. 2 controller.

Turning next to FIG. 5A, the current source 20 for a controller constructed in accordance with the present invention is illustrated. The current source includes a transformer section 114 connected to a source of line power, schematically illustrated at 116. An on-off switch 118 can be used to control the flow of power between line source 116 and transformer section 114. Transformer section 114 includes transformer primary windings $T_{P1}$, $T_{S2}$, and a series of transformer secondary windings $T_{S1}$, $T_{S2}$, and $T_{S3}$. Transformer secondary $T_{S1}$ is connected to a full wave rectifier 120 which supplies the operating current for the resistive heating elements 36 and 38. To this end, the positive output of full wave rectifier 120 is connected to gate circuits 18a and 18b via lead 122. Each gate circuit comprises a pair of n-p-n transistors, the collectors of which are connected to lead 122 and the emitters of which are respectively connected to main leads 40a, 40b. The bases of n-p-n transistors 124a and 126a are both tied via lead 128a to the collector of n-p-n transistor 130a in level shifter 33a while the bases of n-p-n transistors 124b and 126b are both tied to the collector of transistor 130b in level shifter 33b. The bases of the n-p-n transistors 130a, 130b are in turn respectively tied to the outputs of control amplifier circuits 32a and 32b. It can thus be seen that the power control signal $CTL_1$ generated by control amplifier 32a switches on transistor 130a in level shifter 33a, whereupon transistors 124a and 126a are rendered conductive to pass operating current from full wave rectifier 120 through main lead 40a into resistive heating element 36. Similarly, power control signal $CTL_2$ generated by control amplifier 32b switches on transistor 130b in level shifter 33b, gating transistors 124b and 126b in gate circuit 18b to pass power from full wave rectifier 120 through main lead 406 to resistive heating element 38. Return lead 41 completes the current path from the two resistive heating elements back to the negative input of full wave rectifier 120. Of course, level shifters 33a and 33b could be eliminated and the power control signals $CTL_1$ and $CTL_2$ conducted directly to the bases of transistors 124a, 124b, 126a, and 126b. Ihe purpose of level shifters 33a and 33b, however, is to ensure that transistors 124a, 124b and 126a, 126b conduct across the full range of operating current supplied to the resistive heating elements. Hence, level shifters 33a and 33b function as amplifiers for the power control signals $CTL_1$ and $CTL_2$.

At this point it should be noted that lead 43a from current amplifier 24a in FIG. 3 is connected through a diode 141a to lead 128a between transistor 130a and the bases of transistors 124a and 126a. When excessive current flow conditions in resistive heating element 36 render n-p-n transistor 42a in the current amplifier 24a conductive, current is drawn off lead 128a through lead 43a and the conduction of transistors 124a and 124b is decreased, thereby lowering the current flow through main lead 40a to avoid damage to the resistive heating element.

If desired, a voltage clamp 132 may be connected to leads 128a and 128b to limit the output from the gate circuits 18a and 18b during calibration. Voltage clamp 132 includes an FET device 134 having a source connected through a series of diodes 136 to leads 128 and 128b. FET device 134 operates to connect clamping diodes 136, 138a and 138b between leads 128a and 128b and ground in response to a clamping control signal CLAMP supplied along lead 140 from logic circuit 34 (not shown in FIG. 5A) during calibration. A second FET device 142 in voltage clamp 132 is periodically gated by a signal $\overline{BLANK}$ to intermittantly tie clamp diodes 138a and 138b to ground. The $\overline{BLANK}$ signal is also generated in logic 34 and supplied to FET device 142 along lead 144.

The remaining secondary windings $T_{S2}$ and $T_{S3}$ in transformer section 114 are respectively connected to a 5-volt power supply 144 and a 12-volt power supply 146. The 5-volt and 12-volt power supplies are conventionally constructed to provide operating power for the various controller components. 5-volt power supply 144 accordingly contains a voltage rectifier which is connected to transformer secondary $T_{S2}$ to supply D.C. operating power to a voltage regulator 150. Voltage regulator 150, of course, operates to provide a 5-volt output at voltage tap 152. Rectifier 154 in 12-volt power supply 146 rectifies the output from transformer secondary $T_{S3}$, while complementary voltage regulators 156 and 158 respectively operate to provide +12 volt and −12 volt outputs at voltage taps 160 and 162. A 20-volt voltage tap 164 is connected to lead 140 on the positive side of full-wave rectifier 120.

During calibration, the use of the 12-volt power supply 146 to provide operating power for the controller of the present invention is desirable, inasmuch as the 12-volt power supply is inherently more stable than the 20-volt supply from voltage tap 164. FIG. 5B illustrates a simple circuit for use in switching between the 12- and 20-volt supplies. The circuit, indicated generally at 166, includes a p-n-p transistor 168 connected across a 20-volt supply from voltage tap 164 and a 12-volt supply from positive voltage tap 160. Transistor 168 is switched on by the action of an FET device 170 tied to the transistor base. A $\overline{CLAMP}$ signal supplied from logic circuit 34 along lead 172 gates FET 170. The $\overline{CLAMP}$ signal has a value opposite to that of the CLAMP signal used to gate FET 134 in voltage clamp 132. Consequently, during the calibration sequence when power requirements of the controller are minimal the $\overline{CLAMP}$ signal is low and FET 170 remains non-conductive, switching off transistor 168. The positive operating voltage tap 174 is thereafter supplied with the more stable positive 12-volt potential from voltage tap 160. When the calibration sequence has been completed and the controller requires full operating power, the $\overline{CLAMP}$ signal on lead 172 switches high to gate FET 170, in turn rendering transistor 168 conductive. Thereafter, the positive operating voltage tap 174 is supplied with a positive 20-volt potential.

Because the 5-volt power supply 144 powers logic circuit 34, any unacceptable fluctuation in the output from 5-volt power supply 144 could deleteriously effect controller operation. It would be desirable to provide a means for indicating the occurrence of such unacceptable power fluctuations, and to this end a simple circuit 175 may be constructed as illustrated in FIG. 5C. Positive 5-volt potentials from voltage tap 152 of the 5-volt power supply 144 are respectively connected through resistors 176 and 178 to the high and low voltage inputs of a comparator 180. The output of comparator 180 is high during normal controller operation, resulting in a typically low output from inverter 182 connected to comparator 180. This low output supplies a power-on signal PO for certain controller operations to be described hereinbelow. The low output is also converted to a high output by inverter 184 to provide inverted power-on signals $\overline{PO}$. If an unacceptable variation in power supplied by current source 20 should occur, such as might accompany a potentially damaging voltage surge from line source 116, the voltage level at voltage tap 152 of 5-volt power supply 144 will also vary, causing the voltages at the input terminals of comparator 180 to shift. The comparator output will switch low causing the power-on signal PO to switch high while the inverted power-on signal $\overline{PO}$ switches low. In this manner, circuit 175 provides an indication of unacceptable power conditions.

The controller of the present invention is essentially a state machine, i.e., the controller passes through a series of operational states from the moment the controller power is switched on until the point at which the controller is directed to supply heating current to the resistive heating element. At the time of power switch-on, a limit check on the heating element resistance is performed by the aforementioned limit sensing circuit 35 discussed in connection with FIG. 3. If the resistive heating elements are damaged or are not properly connected to the controller, the controller will remain in a zero or "Change Heating Element" state. If, however, the resistive heating elements are properly connected to the controller and are functioning properly according to the limit sensing circuit, the controller will advance through three more states (the first, second and third states) before reaching the fourth or "Calibration" state. The first, second and third states are designed to provide a period of time for monitoring the slope of the current-representative signal $I_{HTR1}$ to insure that the resistive heating element is at room or ambient temperature. After it has been determined that the heating element is indeed at ambient temperature, the controller advances to the "Calibration" state to compute $R_{amb}$ as described hereinabove. Upon completion of the "Calibration" state, the controller is ready to supply current to the resistive heating elements on demand. This last or fifth state is characterized as either a "Ready" state or a "Heat" state depending upon whether the controller operator has signalled a demand for heat.

Figure 6:
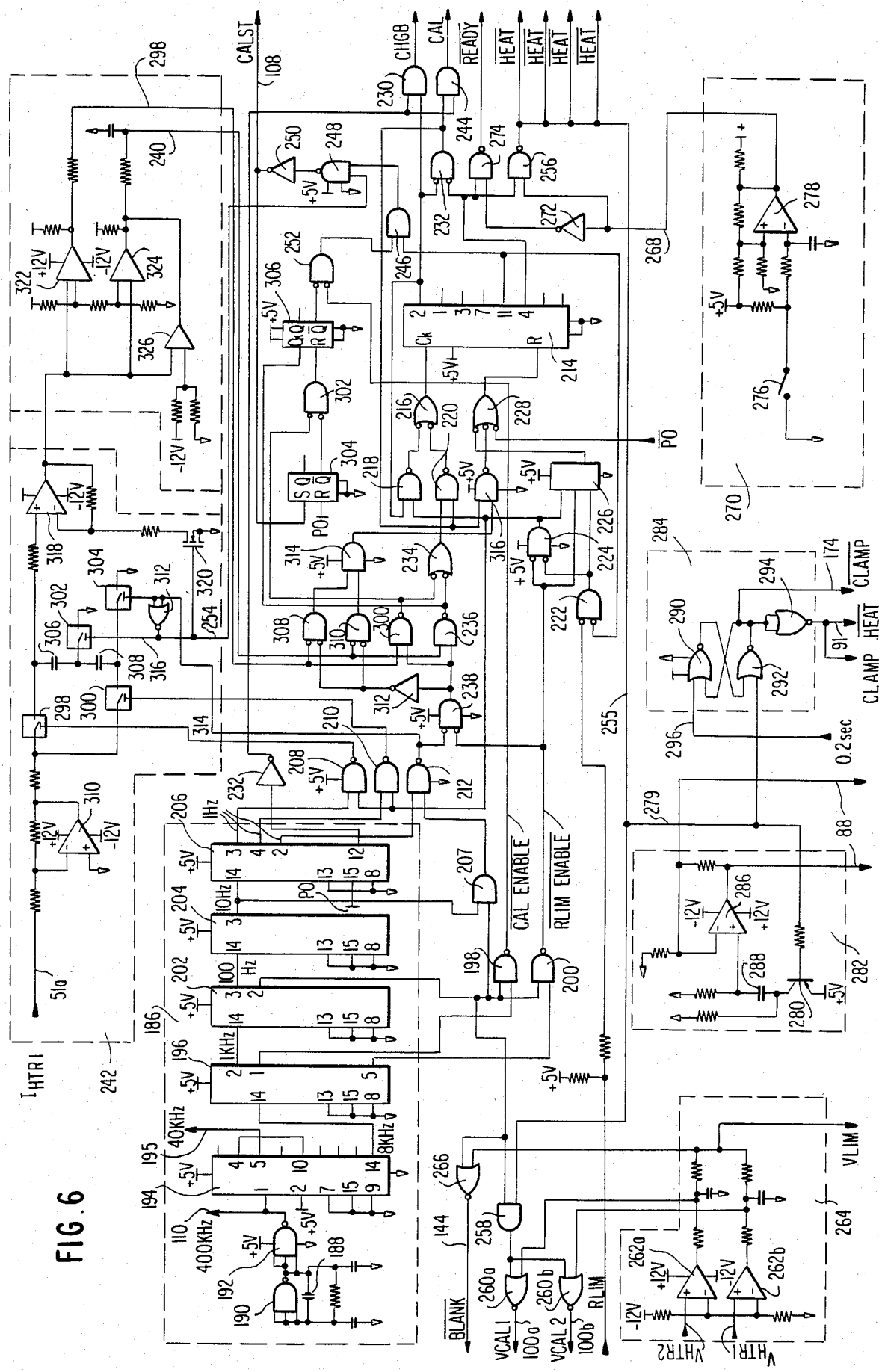
FIG. 6 is a circuit diagram which illustrates a preferred form of logic for governing the operation of the controller shown in FIG. 2.

A logic circuit 34 for implementing the sequences associated with each state of the controller is illustrated in detail in FIG. 6. The logic circuit is driven by a clock circuit 186 including an oscillator 188 connected across the inputs of NAND gates 190, 192. The output of NAND gate 192 is a 400 KHz signal which is supplied to a dividing circuit 194. The 400 KHz output is also supplied to lead 110, where it serves to clock the operation of counters 66a and 66b in variable gain amplifier circuits 28a and 28b as discussed in connection with FIG. 4. Dividing circuit 194 outputs both a 40 KHz signal and an 8 KHz signal. The 8 KHz signal is supplied to a divide-by-eight counter 196. Divide-by-eight counter 196 subsequently outputs three 1 KHz signals in relatively offset fashion. Two of the 1 KHz signals are respectively supplied to $\overline{\text{CAL ENABLE}}$ gate 198 and $\overline{\text{RLIM ENABLE}}$ gate 200. The remaining 1 KHz output from divide-by-eight counter 196 is directed to a series of divide-by-ten counters 202, 204, and 206 which progressively reduce the 1 KHz signal to 100 Hz, 10 Hz and 1 Hz output signals. One of the 100 Hz output signals from divide-by-ten counter 202 is input to the $\overline{\text{CAL ENABLE}}$ and $\overline{\text{RLIM ENABLE}}$ gates 198 and 200. Because the $\overline{\text{CAL ENABLE}}$ and $\overline{\text{RLIM ENABLE}}$ gates are both NAND gates, their outputs are high signals periodically switched low at a 100 Hz rate. The 100 Hz output from divide-by-ten counter 202 is also supplied to one input of AND gate 207. The remaining input of AND gate 207 is supplied by the 10 Hz output from divide-by-ten counter 204, causing AND gate 207 to generate a 10 Hz pulse signal. Finally, three of the 1 Hz output signals from divide-by-ten counter 206 are directed to a series of NAND gates 208, 210 and 212 which supply 1 Hz clocking pulses for the remainder of logic circuit 34.

Shifts in controller state are governed by a state counter 214 such as a National Semiconductor CD4022 divide-by-eight counter. State counter 214 is clocked by the output of NOR gate 216, which is in turn gated by the outputs of a pair of NAND gates 218, 220. NAND gate 218 functions as a "go-ahead" gate for changing the controller operation from the zero state to the first state, while NAND gate 220 functions as will be further described to supply 1 Hz clock pulses to state counter 214 for shifting the state counter between the first and fifth states. The $Q_0$ output of the state counter at the "2" pin is the first high pulse generated by the counter after power switch-on. This high output is supplied to one input of NAND gate 218. The other input to NAND gate 218 is supplied by the RLIM output of limit sensing circuit 35 via the combined action of NOR gates 222 and 224. RLIM is gated through NOR gates 222 and 224 by the respective low value of the $Q_4$ output at state counter pin "11" and the pulses supplied by RLIM enable gate 200. If the resistance of heating elements 36 and 38 are within limits, RLIM is high and NAND gate 218 will supply a low signal to NOR gate 216. The low signal input to NOR gate 216, of course, produces a high output which clocks state counter 214 ahead to the first state. On the other hand, where the resistances of either or both resistive heating elements 36 and 38 exceed the predetermined limits set into limit sensing circuit 35, the consequent low value of the RLIM signal will prevent the clocking of state counter 214 from the zero state to the first state, instead sequentially forcing the carry-out output of divide-by-eight counter 226 low and the output of triple-input NAND gate 228 high to reset state counter. Thus, where the resistances of the resistive heating elements exceed the predetermined limits, state counter 214 is locked into the zero state and further controller operations cannot proceed until the excessive resistance condition is corrected. It can also be seen that the inverted power-on signal $\overline{\text{PO}}$ from circuit 175 of FIG. 5C is supplied to triple-input NAND gate 228 to lock state counter 214 into the zero state upon the occurrence of unacceptable power fluctuations. AND gate 230 passes the high $Q_0$ output signal associated with the zero state in response to gating pulses supplied from divide-by-ten counter 206 through inverter 232, providing a CHGH or "Change Heating Element" signal, indicative of either the excessive resistance condition or the unacceptable power fluctuation condition.

Assuming the successful completion of the resistance limit check, state counter 214 shifts from the zero state to the first state and the $Q_0$ output at pin "2" drops to a low value. The low $Q_0$ output drives the output of NAND gate 218 high, effectively blocking NAND gate 218 from passing any further clock pulses to NAND gate 216. The responsibility for clocking state counter 214 is thereafter taken up by the output of NAND gate 220. At all controller states intermediate the zero state and the fifth state, the $Q_0$ output at pin "2" of counter 214 and the $Q_5$ output at pin "4" of counter 214 are low, driving the output of NOR gate 232 high to enable NAND gate 220. The remaining input to NAND gate 220 is supplied by a NOR gate 234 in response to the operation of NAND gate 236. NAND gate 236 in turn receives a series of 1 Hz clock pulses from NOR gate 238 in response to the gating of pulses from the $\overline{\text{RLIM ENABLE}}$ gate 200 at 1 Hz intervals defined by NAND gate 212. The remaining input of NAND gate 236 is supplied via lead 240 with a high pulse from slope detector 242 whenever the slope of the current-representative signal $I_{HTR1}$ is smaller than a predetermined limit, indicating that the resistance of heating element 36 is at an ambient or room-temperature value. It is, of course, assumed that the resistance of heating element 38 is ambient when the resistance of heating element 36 is ambient. During such conditions, the high signal input on lead 240 enables NAND gate 236 to pass 1 Hz clock pulses from NOR gate 238 through NAND gate 234 to NAND gate 220, whereupon NAND gate 220 passes the clock pulses through NAND gate 216 to state counter 214. Thus, as long as the resistive heating element 36 is at room or ambient temperature, the slope of current-representative signal $I_{HTR1}$ detected by slope detector 242 will remain stable and the output or lead 240 will remain high, permitting NOR gate 238 and NAND gates 236, 234, 220 and 216 to clock counter 214 from the first state to the fourth state. Simultaneously, the high output from NOR gate 232 enables AND gate 244 to pass gating pulses from the carry-out pin "12" of divide-by-ten counter 206 via inverter 232 to provide a high CAL signal indicative of the first through fourth controller states.

Upon reaching the fourth state, the $Q_4$ output at pin "11" of counter 214 switches high, passing through AND gate 246 to NAND gate 248 and thence through inverter 250 to provide the CALST signal which marks the beginning of the calibration sequence. It will be recalled that the CALST signal initiates the operation of counter 66a and 66b in first variable gain amplifier circuits 28a and 28b for the purpose of computing $R_{amb}$ as previously described in connection with FIG. 4. AND gate 246 is enabled by NOR gate 252, the output of which switches to a high value between low voltage excursions of the output signal from $\overline{\text{CAL ENABLE}}$ gate 198. NAND gate 248 is enabled by a signal on lead 254 from slope detector 244. It can also be seen that the $Q_5$ output from state counter 214 remains at a low value during the fourth state. Hence, the output on lead 255 from NAND gate 256 is high. This output, characterized as the $\overline{\text{HEAT}}$ signal, enables AND gate 258 to supply 100 Hz gating pulses from divide-by-ten counter 202 to one input each of NOR gates 260a, 260b. The remaining inputs to NOR gates 250a, 260b are respectively derived from comparators 262a, 262b in low voltage limit sensing circuit 264. Comparators 262a and 262b receive the voltage-representative signals $V_{HTR1}$ and $V_{HTR2}$ from voltage amplifying circuits 22a and 22b of FIG. 3. The outputs of comparators 262a and 262b are both low as long as the voltage drops across resistive heating elements 36 and 38 are within limits acceptable for performing the calibration sequence (i.e., less than 0.25 V). As a net result, the output signals VCAL1 and VCAL2 of NOR gates 260a and 260b both drop to a low value with the clocking of each pulse from divide-by-ten counter 202. Each low VCAL1 and VCAL2 signal operates to close digital switches 98a and 98b in FIG. 4, connecting the 0.25 V reference potential from calibration voltage supply 92 to respective summing junctions 31a and 31b in control amplifier circuits 32a and 32b. The 0.25 V calibration potential is thereafter imposed across resistive heating elements 36 and 38 and the calibration sequence proceeds as described hereinabove. Because the $Q_5$ output from state counter 214 remains low during the fourth state, of course, the CAL output from AND gate 244 remains high. NOR gate 222, however, is disabled by the high $Q_4$ output to prevent the passage of RLIM signals until the fifth state is reached. It should also be noted that the output from comparators 262a and 262b in low voltage limit sensing circuit 264 are supplied to NOR gate 266 in order to enable the passage of clock pulses from divide-by-ten counter 202. The output of NOR gate 266 provides the $\overline{\text{BLANK}}$ signal used to turn off FET device 142 in the voltage clamp 132 of FIG. 5A while the calibration sequence is occuring.

At the conclusion of the calibration sequence, state counter 214 is clocked ahead from the fourth to the fifth state. Accordingly, the $Q_4$ output at pin "11" of counter 214 switches to a low value, removing the CALST signal from lead 108. At the same time, the $Q_5$ output of state counter 214 at pin "4" switches high to drive the output of NOR gate 232 low, effectively blocking the passage of clock pulses through NAND gates 220 and 216. State counter 214 is subsequently locked into the fifth state. Where no demand for heat from the resistive heating elements has been signaled, the output or lead 268 from a heating demand switch circuit 270 is low. Thus, the output from NAND gate 256 remains high while the output from inverter 272 also connected to lead 268 combines with the high $Q_5$ signal to drive the $\overline{\text{READY}}$ output signal from NAND gate 274 low. The low $\overline{\text{READY}}$ signal provides an indication that the calibration sequence has been completed and that the resistive heating elements are now ready to heat. A demand for heating is signaled by closing an on-off switch 276 in heating demand circuit 270, whereupon comparator 278 switches high. The high signal on lead 268 now operates to drive the $\overline{\text{HEAT}}$ signal output from NAND gate 256 low, at the same time causing inverter 272 to drive the $\overline{\text{READY}}$ signal output from NAND gate 274 high. The low $\overline{\text{HEAT}}$ signal is directed to various portions of the controller to initiate the resistive heating element heating sequence. For example, the low $\overline{\text{HEAT}}$ signal supplied to AND gate 258 causes the VCAL1 and VCAL2 outputs from NOR gates 260a and 260b to switch high, opening digital switches 98a and 98b in control amplifier circuits 32a and 32b to remove the 0.25 V reference potential from summing junctions 31a and 31b. Simultaneously, the low $\overline{\text{HEAT}}$ signal is directed via lead 279 to the base of a forward-biased or p-n-p transistor 280 in optocoupler current source 282 and to a delay circuit 284. The p-n-p transistor 280 is biased into conduction by the low $\overline{\text{HEAT}}$ signal, causing amplifier 286 to supply operating current on leads 88 for energizing the optocouplers 82a and 82b in the variable gain amplifier circuits 30a and 30b of FIG. 4. It will be recalled that optocouplers 82a and 82b are employed to shunt photoresisters 86a and 86b into the resistive feedback networks 76a and 76b of amplifiers 72a and 72b for the purpose of preventing thermal shock to the resistive heating elements 36 and 38 at the outset of the heating sequence. After p-n-p transistor 280 conducts for a short interval, the charge on capacitor 288 in optocoupler current source 282 reaches a steady-state value, causing the output of amplifier 286 on leads 288 to decrease. LED 84a and LED 84b are then deenergized to remove photoresisters 86a and 86b from the feedback networks, and the full value of the gain factor $(1+\alpha\Delta T)$ in variable gain amplifier circuits 30a and 30b is applied across amplifiers 72a and 72b.

Delay circuit 284 is designed to introduce a brief delay into the operation of the control amplifier circuits 32a and 32b following the controller shift from the fourth to the fifth state, giving LED 84a and LED 84b in optocouplers 82a and 82b an opportunity to reach full optical power before the product signals from variable gain amplifier circuits 30a and 30b are applied to control amplifiers 92a and 92b in the control amplifier circuits 32a and 32b. To this end, NOR gates 290, 292 and 294 in delay circuit 284 are arranged as shown in FIG. 6. NOR gate 290 receives enabling pulses from an audio display means (to be described in connection with FIG. 7) via lead 296. These enabling signals arrive at 0.2 second intervals. Hence, approximately 0.1 seconds after the low $\overline{\text{HEAT}}$ signal from NAND gate 256 arrives at the input to NOR gate 292, the output of NOR gate 290 is switched low to generate a high output from NOR gate 292. The output of NOR gate 294 is in turn driven low and supplied as a delayed $\overline{\text{HEAT}}$ signal along lead 91 to digital switches 90a and 90b in control amplifier circuits 32a and 32b of FIG. 4. Digital switches 90a and 90b accordingly close to connect the product signal from variable gain amplifier circuits 30a and 30b to the summing junctions 31a and 31b whereupon control signals $CTL_1$ and $CTL_2$ are generated by control amplifiers 92a and 92b as disclosed in connection with FIG. 4. The low output from NOR gate 294 is also used to supply the CLAMP signal for voltage clamp 132 in FIG. 5A. When the output of NOR gate 294 switches low at the initiation of the heating sequence, FET device 134 in voltage clamp 132 is deactivated to shut off the voltage clamp. In a somewhat similar fashion, the output from NOR gate 292 supplies the $\overline{\text{CLAMP}}$ signal on lead 172 for the power-switching circuit of FIG. 5B. A low output from NOR gate 292, which occurs from the zero state to the fourth state of the controller (i.e., when the $\overline{\text{HEAT}}$ signal is high) turns off FET device 170 to connect the positive twelve volt potential from voltage tap 160 of FIG. 5A to voltage tap 174 in the power-switching circuit. On the other hand, where the output of NOR gate 292 is driven high 0.1 seconds into the fifth controller state, the high $\overline{\text{CLAMP}}$ signal gates FET device 170 to turn transistor 168 of FIG. 5B on, connecting a positive twenty-volt potential to voltage tap 174.

Due to the effective blockage of pulses through NAND gates 220 and 216 in response to the high $Q_5$ output, state counter 214 will as previously noted remain at the fifth state in either a "Ready" of "Heat" mode depending upon the position of on-off switch 276. Should the resistance of either heating element 36 or 38 exceed the limits set into limit sensing circuit 35, however, the action of NOR gates 222 and 224, divide-by-eight counter 226 and triple-input NAND gate 228 will reset state counter 214 to the zero state as previously described, and normal controller operations cannot be resumed until the excessive resistance conditions are corrected. If the excessive resistance conditions are caused by the accidental disconnection of resistive heating element 36 (and, by implication, resistive heating element 38) from the controller, logic circuit 34 provides a means for resuming normal controller operation upon reconnection of the resistive heating elements as long as certain constraints are met. That is, if the resistive heating elements become disconnected during the heating sequence and are quickly reconnected such that the temperatures of the heating elements remain at a high value, the controller need not be recalibrated prior to resuming the heating sequence. This is accomplished by supplying a high signal indicative of high heating element temperature on lead 298 from slope detector 242. Lead 298 provides one input for NAND gate 300. The other input of NAND gate 300 is provided by 1 Hz clock pulses from NOR gate 238. The output of NAND gate 300 is connected to both NAND gate 234 and NOR gate 302. It can thus be seen that NAND gate 300 provides an alternate path for passing clock pulses around NAND gate 236 to state counter 214. Where resistive heating element 36 has been disconnected from the controller and then quickly reconnected such that the temperature of the heating element is maintained at a high level, the presence of NAND gate 300 permits state counter 214 to be clocked from the zero state back to the fifth state despite the absence of a high signal on lead 240 from slope detector 242. Simultaneously, the action of NOR gate 302 in response to both the output of NAND gate 300 and the $\bar{Q}$ output of flip-flop 304 resets flip-flop 306, driving the value of NOR gate 252 low to block the passage of the high $Q_4$ output from state counter 214 through AND gate 246. In this manner, the CALST signal does not appear on lead 108 as state counter 214 shifts through the fourth state and the value of $R_{amb}$ previously locked into the counters 66a and 66b of the first variable gain amplifier circuits 28a and 28b remains intact. On the other hand, where a power fluctuation causes the state counter 214 to be reset to the zero state as described hereinabove, a high PO signal directed to the reset of flip-flop 304 acts to remove the reset from flip-flop 306. NOR gate 252 is accordingly enabled and the CALST signal once again appears on lead 108 to initiate the calibration sequence when the state counter 214 shifts back into the fourth state. In a similar fashion, if resistive heating elements 36 and 38 are disconnected from the controller for a period sufficient to induce substantial cooling in the heating elements, or if the power flow to the controller is interrupted for a like period, the slope detector 242 will output low signals on both leads 240 and 298. NAND gates 236 and 300 are then disabled to prevent the normal 1 Hz clocking of state counter 214 through NAND gates 234, 220 and 216 while NOR gates 208 and 310 are enabled to pass 1 Hz pulses from NOR gate 238 through inverter 312 to AND gate 314. The output of AND gate 314 in turn drives NAND gate 316 to reset state counter 214 via triple-input NAND gate 228. State counter 214 will continue to be reset until the resistive heating elements cool to an ambient temperature, at which time the state counter resumes normal shifting between states. With the high signal now gone from lead 298, the output of NAND gate 300 switches high to drive NOR gate 302 low. Flip-flop 306 is thus not reset and NOR gate 252 once again enables AND gate 246 to pass high values of $Q_4$ from state counter 214 through NAND gate 248 and inverter 250 to provide CALST signals. Following prolonged disconnection of the resistive heating elements 36 and 38 from the controller, then, the calibration sequence associated with the fourth state will be fully implemented as though the controller were just being switched on, and a new value of $R_{amb}$ will be entered into digital counters 66a and 66b in variable gain amplifier circuits 30a and 30b.

The operation of slope detector 242 can be more fully understood by further reference to FIG. 6. Slope detector 242, includes a series of digital switches 298, 300, 302, and 304 for variously charging and discharging a pair of capacitors 306 and 308 with the current-representative signal $I_{HTR1}$ supplied by current-to-voltage converter 26a to slope detector 242 via lead 51a (see FIG. 3). Note that signal $I_{HTR1}$ is multiplied by a gain factor of $-5$ in amplifier 310 prior to entering the digital switch network, thereby increasing the sensitivity of the slope detector measurement. At time $t_0$, the clock pulse from NAND gate 208 drops to a low value, permitting digital switch 298 to close. The output from NAND gate 212 is high at $t_0$, but the presence of NOR gate 312 connected between the output lead 314 of NAND gate 212 and the input lead 316 of digital switch 302 creates a low input signal condition which acts to close digital switch 302. With digital switches 298 and 302 both closed, a current path from lead 51a through capacitor 306 to ground exists, and capacitor 306 is charged to the value of $I_{HTR1}$. The output pulse from NAND gate 208 thereafter rises to a high value to open digital switch 298, while the output of NAND gate 212 remains high to maintain digital switch 302 in a closed position. At time $t_1$ (approximately 0.8 seconds after $t_0$, where divide-by-ten counter 206 is a National Semiconductor CD4017 counter with pin connections arranged as illustrated in FIG. 6), the output from NAND gate 210 drops to a low value, closing digital switch 300. The current path from lead 51a to ground now passes through capacitor 308, which capacitor is accordingly charged with the signal $I_{HTR1}$. The NAND gate 210 output subsequently returns to a high value and digital switch 300 opens. Any change occurring in the value of $I_{HTR1}$ between times $t_0$ and $t_1$ will be reflected as a difference in the charge accumulated on capacitor 306 relative to the charge accumulated on capacitor 308. This difference is measured by outputting a low signal from NAND gate 212 along output lead 314 at time $t_2$, where $t_2 > t_1$. The low NAND gate 212 output closes digital switch 304 and through the action of NOR gate 312 causes digital switch 302 to open. Capacitors 306 and 308 are thus grounded across the high input of differential amplifier 318. The high signal produced on input lead 316 as a result of the low output from NAND gate 212 also enables NAND gate 248 via lead 254 while gating an FET device 320 connected to the low input of differential amplifier 318, rendering the differential amplifier fully operational.

The output from differential amplifier 318 has a magnitude proportional to the difference in charge stored on the two capacitors 306 and 308, and hence provides a measure of the amount of change or slope of current-representative signal $I_{HTR1}$ as a function of time. This output is supplied to comparators 322, 324 and 326. Comparator 322 generates a high signal on lead 298 whenever the rate of change or slope of $I_{HTR1}$ is greater than a predetermined value, indicating that the resistive heating element 36 is cooling rapidly from a high temperature. Comparator 324 generates a high signal on lead 240 whenever the rate of change or slop of $I_{HTR1}$ is less than a predetermined value, indicating that the resistive heating element is essentially quescient or at ambient temperature. Low outputs from both comparators 322 and 324 indicate that the slope of $I_{HTR1}$ is less than the predetermined high amount but greater than the predetermined low amount. This condition occurs where the resistive heating element 36 is cooling slowly. Comparator 326 generates a high signal on lead 240 whenever the slope of $I_{HTR1}$ exceeds a predetermined negative value, indicating that the resistive heating element is warming up. It is assumed that the temperature condition of resistive heating element 38 parallels that of resistive heating element 36, and for this reason the slope of current-representative signal $I_{HTR2}$ is not separately detected.

Figure 7:
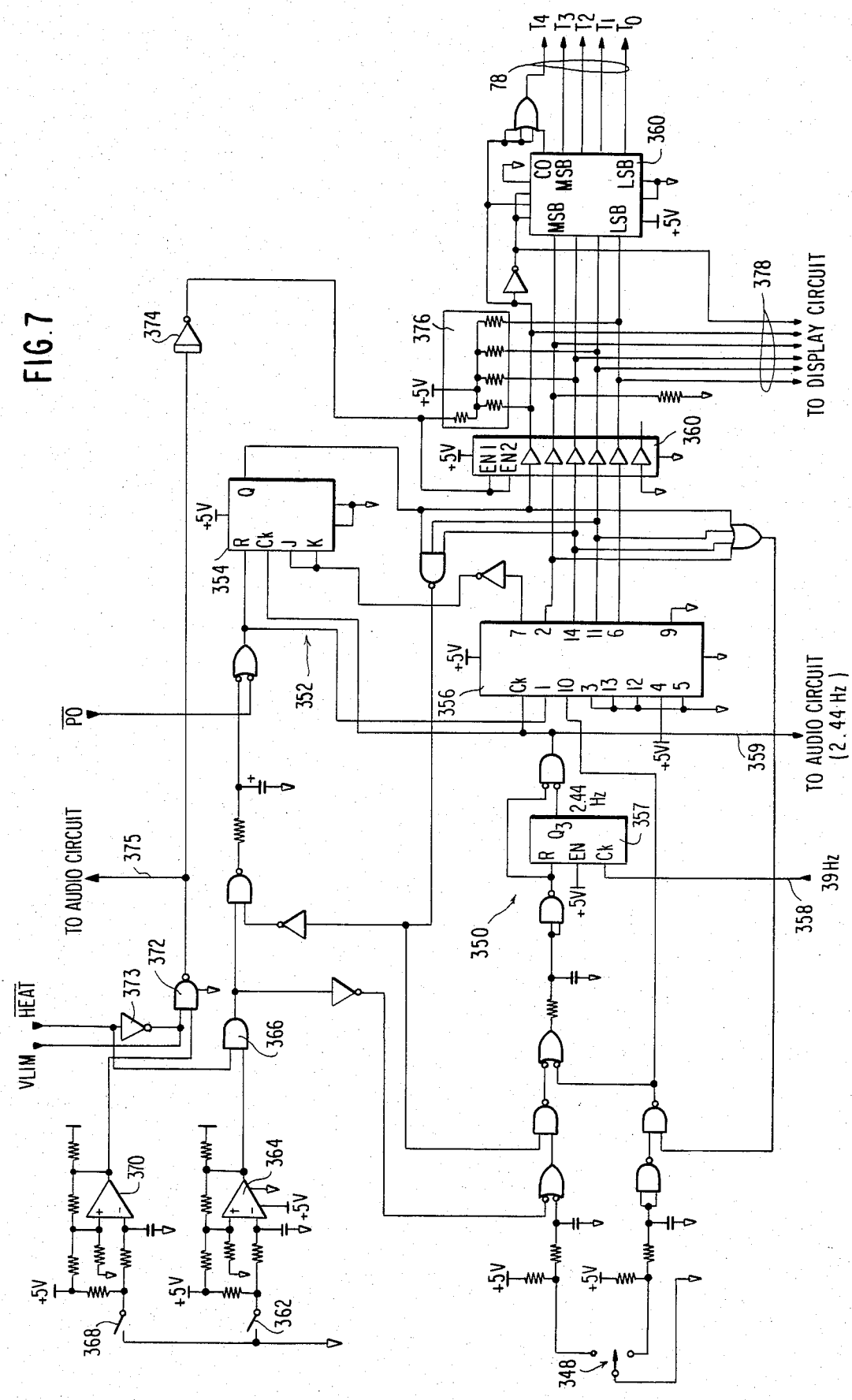
FIG. 7 is a circuit diagram of a parameter input circuit employed in connection with the FIG. 2 controller.

A parameter input circuit for use with the controller of the present invention is illustrated in FIG. 7. The parameter input circuit is designed to program the desired temperature of the resistive heating elements into the digital-to-analog converters 74a and 74b of variable gain amplifier circuits 30a and 30b. Accordingly, an up-down switch 348 is provided to drive a clocking network 350 connected to a combination counter 352. Depending upon the position of switch 348, combination counter 352 counts up or down to generate Binary Coded Decimal representations of temperatures, thereby permitting the controller operator to select any one of a number of desired temperatures within the range of combination counter 252. Combination counter 350 includes a flip-flop 354 for counting by hundreds and an up-down counter 356 for counting by tens. The count rate for both the flip-flop 354 and the up-down counter 356 is established at 2.44 Hz by a binary counter 357 in clocking network 350, which counter 357 receives 39 Hz clock pulses via lead 358 from an audio circuit to be described in connection with FIG. 9. The 2.44 Hz count rate signal is returned to the audio circuit of FIG. 9 via lead 359. The output from flip-flop 354 and the outputs from up-down counter 356 are passed through a buffer 360 to an adder 361 which functions as a BCD-to-binary converter. The output of adder 361 is thus a binary representation of the desired temperature, and is supplied along leads 78 to digital-to-analog converters 74a and 74b for the purpose of setting the temperature parameter $(1+\alpha\Delta T)$ as described hereinabove.

A ROLL switch 362 remote from the controller can serve as an optional means for driving up the count in combination counter 352. With the closure of ROLL switch 362, comparator 364 outputs a high value to AND gate 366, which AND gate is enabled by a high $\overline{HEAT}$ signal from the output of NAND gate 256 in logic circuit 34. As long as the controller remains in the "Ready" mode of the fifth state (i.e., as long as the $\overline{HEAT}$ signal remains high), the output of comparator 364 can pass through AND gate 366 to clock combination counter 352. In contrast, the switching of the $\overline{HEAT}$ signal to a low state when a demand for heat is signalled to logic circuit 34 disables AND gate 366 to effectively disconnect ROLL switch 362. Another remote control switch 368 may be provided to automatically advance the desired temperature setting to a predetermined upper limit. The closure of switch 368 forces the output from comparator 370 high. This high comparator output is in turn supplied to a NAND gate 372. NAND gate 372 is enabled by either a low $\overline{HEAT}$ signal received from logic circuit 34 via inverter 373 or a high VLIM signal received from the low voltage limit sensing circuit 364 of logic circuit 34. The output of NAND gate 372 is passed through an inverting transistor driver 374 to operate a series of pull-up resistors 376 having values prearranged to supply adder 362 with the Binary Coded Decimal representation of the predetermined upper limit temperature. If desired, a series of leads 378 connected between the output of buffer 360 and the input of adder 361 may be employed to deliver the BCD representation to a display means (not shown in FIG. 7) for the purpose of providing a visual indication of the desired temperature as selected.

FIG. 8 illustrates a display means suitable for use with the controller of the present invention. The display means comprises a circuit section 380 for visually displaying the state of the controller and a circuit section 382 for visually displaying the value of the desired temperature selected by the controller operator. Circuit section 380 includes a series of LED devices 384, 386, 388 and 390 respectively paired with current-limiting resistor networks 392 and 394. LED devices 384–390 may be color coded if desired. The logic circuit signals associated with the "Change Heating Element" and "Calibration" states, i.e., the CHGH and CAL signals, are respectively gated through NOR gates 396 and 398 to resistive network 392 via series-connected inverters 400, 402 and 404, 406. The high CHGH signal indicative of the "Change Heating Element" state drives inverter 402 low to activate LED device 384, while the high CAL signal indicative of the "Calibration" state drives inverter 406 low to activate LED device 386. In a similar fashion, the logic circuit signals associated with the "Ready" and "Heat" modes of the fifth controller state, i.e., the $\overline{READY}$ signal and the $\overline{HEAT}$ signal, are respectively gated through NAND gates 408 and 410 to resistive network 394 via inverters 412 and 414. The low $\overline{READY}$ signal indicative of the "Ready" mode drives inverter 412 low to activate LED display 388, while the low $\overline{HEAT}$ signal indicative of the "Heat" mode drives inverter 414 low to activate LED display 390. Both NOR gates 396 and 398 are supplied with the power-on signal PO, and both NAND gates 408 and 410 are supplied with the inverted power-on signal $\overline{PO}$. It will be recalled with reference to FIG. 5C that unacceptable power conditions in the controller respectively switch the PO signals high and the $\overline{PO}$ signals low. Thus, in the event of an unacceptable power condition all of the inverters 402, 406, 412 and 414 will be driven low to simultaneously activate all of the LED displays 384–390.

Circuit Section 382 of the FIG. 8 display means includes a seven-segment LED display device 416 and a dual seven-segment LED display device 418. Display device 418 provides a display of the hundreds digit and the tens digit of the desired temperature as selected. Accordingly, the BCD representation of the desired temperature generated by the parameter input circuit of FIG. 7 is conducted along leads 378 from the parameter input circuit to a pair of decoders 420 and 422. Each of the decoders may comprise a National Semiconductor CD4511 BCD-to-seven segment latch. The outputs from decoders 420 and 422 are passed through a series of resistive networks 424–430 to the inputs of display device 418, whereupon the visual representation of the desired temperature hundreds digit and tens digit is generated. Display device 416 provides a visual display of the ones digit of the selected temperature. However, since the combination counter 352 of FIG. 7 only counts by tens, display means 416 is permanently locked into a "zero" representation.

Turning to FIG. 9, a means for providing an audio indication of various controller states is shown. The audio circuit includes a speaker 432 driven by a pair of transistors 434 and 436 in response to the output of amplifier 438. The gain of amplifier 438 may be changed by adjusting a variable resistor or volume control 439 to vary the loudness of the speaker output. Amplifier 438 is supplied with 312 Hz tone signals generated by a twelve-stage-binary counter 440 in response to 1250 Hz clock signals from counter 442. Counter 442 is in turn clocked by the 40 KHz output of dividing circuit 194 in logic circuit 34. When active, binary counter 440 also outputs 4.88 Hz and 0.31 Hz signals, the 4.88 Hz signal being used to supply lead 296 with the 0.2 second enabling pulses for NOR gate 290 of the delay circuit 284 in logic circuit 34. The reset input of binary counter 440 is connected to the output of AND gate 444. One input to AND gate 444 carries the $\overline{HEAT}$ signal from NAND gate 256 in logic circuit 34. The other input to AND gate 444 is supplied by the inverted power-on signal $\overline{PO}$ from the circuit of FIG. 5C. The 0.31 Hz output from binary counter 440 drives a latching circuit 445 including NOR gates 446 and 448. The output of latching circuit 445 is connected to one input of NOR gate 450. The other input of NOR gate 450 is supplied by the output of NAND gate 452, the inputs of which NAND gate are respectively derived from a comparator 454 and lead 456 connected to the output of NAND gate 372 in parameter input circuit of FIG. 7. Comparator 454 switches high or low depending upon the value of the control signal $CTL_1$ generated by the control amplifier circuit 32a of FIG. 4, while the output of NAND gate 372 alternates between a high or low value depending upon the position of switch 368 in FIG. 7. The output of NOR gate 450 enables NOR gate 456 to pass the 4.88 Hz signal from binary counter 440 through NAND gate 458 to NAND gate 460. NAND gate 460 is designed to interrupt the 312 Hz signal directed from binary counter 440 to amplifier 438, as will be described hereinbelow. NOR gate 462 connected to receive the output from NAND gate 460 functions to block the 312 Hz signals from reaching amplifier 438 when a "click" circuit also described hereinbelow is operational.

As the controller is shifting from the zero state to the fourth state, it will be recalled that the $\overline{HEAT}$ signal is high. Assuming that acceptable power conditions in the controller exist, i.e., assuming that PO signal is high as well, the output of AND gate 444 is switched high and binary counter 440 is latched into a reset condition. Thus, during the zero through the fourth controller state no output signals are produced by binary counter 440, and speaker 432 remains silent. After the controller has shifted into the fifth state, however, a demand for heat will switch the $\overline{HEAT}$ signal low as previously described, disabling AND gate 444 to remove the reset from counter 440. Thereafter, binary counter 440 begins to output the 312 Hz, 4.88 Hz and 0.31 Hz signals. The 0.31 Hz signal does not appear for approximately the first second and a half of counter operation. Accordingly, the output of latching circuit 445 is high and the output of NOR gate 450 is low. NOR gate 456 subsequently passes an inverted 4.88 Hz signal through NAND gate 458 to enable NAND gate 460 at periodic inervals defined by the 4.88 Hz signal. As a net result, the output of NAND gate 460 is a series of tone bursts, i.e., 312 Hz signals intermittently interrupted by the high voltage excusions of the inverted 4.88 Hz signal from NOR gate 456. Speaker 432 generates a "beeping" sound in response to these tone bursts.

After a one and a half second delay, the first 0.31 Hz pulse is output from binary counter 440, forcing the output of NOR gate 446 low to latch circuit 445. Assuming that switch 368 is open, the output from NAND gate 372 in parameter input circuit is high. At this point, if the value of $CTL_1$ exceeds a predetermined limit set into comparator 454, indicating that the resistive heating elements 36 and 38 are still being heated, the comparator output is low and the output from NAND gate 452 is high. NOR gate 450 continues to output a low signal to enable NOR gate 456, and the 4.88 Hz signal from binary counter 440 continues to pass through NOR gate 456 and NAND gate 458 to interrupt the 312 Hz signal output from binary counter 440. When the control signal $CTL_1$ drops to a fixed level, however indicating that the resistive heating elements 36 and 38 have reached the desired temperature, the output of comparator 454 switches high to drive the output of NAND gate 452 low. Because circuit 445 is also latched into a low value, the output of NOR gate 450 is locked high. NOR gate 456 is in turn disabled, outputting a low signal regardless of the presence of the 4.88 Hz signal from binary counter 440. NAND gate 458 is then driven high and the 312 Hz signal output from binary counter 440 passes through NAND gate 460 in inverted fashion to supply amplifier 438 with a continuous series of 312 Hz pulses. Hence, speaker 432 begins to generate a steady tone, alerting the controller operator to the fact that heating elements 36 and 38 have reached the desired temperature. This steady tone will continue as long as the resistive heating elements remain at the desired temperature. Where cooling of the resistive heating elements occurs, of course, the magnitude of the control signal $CTL_1$ rises to increase both the voltage drop across and current flow through resistive heating element 36, whereupon the output of comparator 454 switches high to drive the output of NAND gate 452 low. NOR gate 450 is unlocked to permit the passage of 4.88 Hz signal through NOR gate 456, again interrupting the 312 Hz output from binary counter 440 and producing a "beeping" sound from speaker 432. Similarly, the closing of switch 368 in FIG. 7 for the purpose of automatically advancing the desired temperature setting to a predetermined upper limit forces the output of NAND gate 372 low. If the resistive heating elements are otherwise at the desired temperature, i.e., if the output from comparator 454 is high, the output of NAND gate 452 is also driven high to enable NOR gate 456 via NOR gate 450, and speaker 432 will yet again start "beeping".

The audio means of FIG. 9 further includes a "click" circuit 464 which provides an audio indication of the up/down count performed by the combination counter 352 in the parameter input circuit of FIG. 7. It can be seen that counter 442 outputs a 312 Hz signal and a 39 Hz signal in addition to the aforementioned 1250 Hz signal. The 39 Hz signal is supplied on lead 358 to counter 357 in a parameter input circuit in order to establish the 2.44 Hz count rate for combination counter 352. The 2.44 Hz count rate signal returns to the "click" circuit of FIG. 9 on lead 359 to clock flip-flop 466.

Simultaneously, the 312 Hz signal output from counter 442 clocks a counter 468, the Q₂ output of which counter 468 governs the reset of flip-flop 466. The combined action of flip-flop 466 and counter 468 produces a 13 msec pulse from the Q output of flip-flop 466 each time the combination counter 352 in the parameter input circuit counts up by ten or down by ten. This 13 msec pulse enables a NAND gate 470 while disabling NOR gate 462. It can be seen that NAND gate 470 is supplied with the 1250 Hz clock pulses from counter 442. Consequently, during the 13 msec interval defined by the Q output pulse from flip-flop 466, a 1250 Hz tone signal is passed through NAND gate 470 to amplifier 438, but the passage of any 312 Hz signal pulses through NOR gate 462 to amplifier 438 is blocked. Speaker 432 then generates a 1250 Hz tone burst or "click". The "click" appears each time combination counter 352 of the parameter input circuit counts up or down, providing the controller operator with audio confirmation of the input parameter circuit counting operation.

Industrial Applicability

The controller of the present invention utilizes the relationship between the voltage, current and resistance in an electrical conductor to establish an operating sequence for regulating the flow of current from a current source through a resistive heating element. More particularly, the resistance of the resistive heating element at a desired heating element temperature is computed and employed as a target ratio for comparing the voltage drop across the resistive heating element with the current flow through the resistive heating element. In this manner, the resistive heating element can be precisely controlled to the desired temperature, and the controller of the present invention thus has wide applicability in any environment where such precision temperature control is advantageous.

The present invention has been set forth in the form of several preferred embodiments. It is nevertheless understood that modifications to the controller configurations disclosed herein may be made by those skilled in the art without departing from the spirit and scope of the present invention. Moreover, such modifications and variations are considered to be within the purview of the appended claims.

What is claimed is:

1. An apparatus for controlling the flow of current from a current source through a resistive heating element disposed on a surgical scalpel such that the resistive heating element is heated from an ambient temperature to a predetermined temperature, said apparatus comprising:

voltage measuring means for sensing the magnitude of the voltage drop across the resistive heating element and for generating a voltage-representative signal having a value corresponding to the magnitude of the voltage drop so sensed;

current measuring means for sensing the magnitude of current flowing through the resistive heating element and for generating a current-representative signal having a value corresponding to the magnitude of the current so sensed;

resistance computing means for generating a computed resistance signal having a value corresponding to the predicted resistance of the heating element at the predetermined temperature, said resistance computing means including a calibration means which produces a first signal for use in generating said computed resistance signal, said first signal having a value corresponding to the resistance of the resistive heating element at the ambient temperature, said resistance computing means also including a temperature parameter means which produces a second signal for use in generating said computed resistance signal, said second signal having a value corresponding to a temperature parameter which varies as a function of the predetermined temperature;

ratio comparision circuit means for generating a control signal, said ratio comparison circuit means including a multiplying means connected to said current measuring means and said resistance computing means for deriving a product signal having a value which corresponds to the product of said values of said current-representative signal and said computed resistance signal, said ratio comparison circuit means also including a summing means connected to said multiplying means and said voltage measuring means for combining said product signal with said voltage-representative signal in order to generate said control signal; and means connected to receive said control signal for regulating the flow of current between the current source and the resistive heating element in response to the magnitude of said control signal.

2. An apparatus as set forth in claim 1, wherein said multiplying means includes a multiplying circuit for respectively multiplying said current-representative signal by said first and second signals to obtain a product signal corresponding to the product of said values of said current-representative signal and said computed resistance signal.

3. An apparatus as set forth in claim 2, wherein said multiplying circuit includes at least one digital-to-analog converter.

4. An apparatus as set forth in claim 3, wherein said multiplying circuit includes a first digital-to-analog converter which receives both said current-representative signal and said first signal, said first digital-to-analog converter thereafter operating to generate an output having a value representing the value of said current-representative signal multiplied by said first signal, said multiplying circuit also including an amplifier connected to a second digital-to-analog converter which receives both said output from said first digital-to-analog converter and said second signal, said amplifier and said second digital-to-analog converter thereafter operating to generate said product signal.

5. An apparatus as set forth in claim 2, wherein said summing circuit means includes an amplifier having one input connected to receive both said voltage-representative signals from said voltage measuring means and said product signal from said multiplying circuit.

6. An apparatus for controlling the flow of current from a current source through at least one resistive heating element such that the resistive heating element is heated from an ambient temperature to a predetermined temperature, said apparatus comprising voltage measuring means for sensing the magnitude of the voltage drop across the resistive heating element and for providing a voltage-representative signal having a value corresponding to the magnitude of the voltage drop so sensed; current measuring means for sensing the magnitude of the current flowing through the resistive heating element and for generating a current-representative signal having a value corresponding to the magnitude of the current so sensed; resistance computing means for generating a computed resistance signal having a value corresponding to the predicted resistance of the resistive heating element at the predetermined temperature, said resistance computing means including a calibration means which produces an ambient resistive signal for use in generating said computed resistance signal, said ambient resistance signal having a value corresponding to the resistance of the resistive heating element at the ambient temperature, said resistance computing means also including a temperature parameter means which produces a temperature parameter signal for use in generating said computed resistance signal, said temperature parameter signal having a value corresponding to a temperature parameter which varies as a function of the predetermined temperature; ratio comparison circuit means for generating a control signal to regulate the flow of current from the current source to the resistive heating element, said ratio comparison circuit including a multiplying means connected to receive said current-representative signal and said computed resistance signal for generating a product signal having a value representing the product of said values of said current-representative signal and said computed resistance signal, said ratio comparison circuit also including a summing means connected to receive said product signal and said voltage-representative signal for outputting said control signal as a function of the difference between said value of said voltage-representative signal and said value of said product signal; and means connected to receive said control signal for causing current to flow between the current source and the resistive heating element in response to said value of said control signal.

7. An apparatus as set forth in claim 6 including a parameter input means for programming the value of the predetermined temperature into said temperature parameter means.

8. An apparatus as set forth in claim 6, wherein said ratio comparison circuit means includes a multiplying circuit for respectively multiplying said current-representative signal by said ambient resistance signal and said temperature parameter signal to obtain said product signal.

9. An apparatus as set forth in claim 8, wherein said multiplying circuit includes a first variable gain amplifier circuit which multiplies said current-representative signal by said ambient resistance signal to obtain an output signal, said multiplying circuit also including a second variable gain amplifier circuit which multiplies said output signal from said first variable gain amplifier circuit by said temperature parameter signal to obtain said product signal.

10. An apparatus as set forth in claim 9, wherein said first variable gain amplifier circuit includes a digital-to-analog converter which receives both said current-representative signal and said ambient resistance signal, said first digital-to-analog converter thereafter operating to generate said output signal.

11. An apparatus as set forth in claim 9 wherein said second variable gain amplifier circuit includes an amplifier having a digital-to-analog converter connected to the input of the amplifier, said second digital-to-analog converter being connected to receive both said output signal from said first variable gain amplifier circuit and said temperature parameter signal such that said amplifier generates said product signal.

12. An apparatus as set forth in claim 11 wherein said calibration means includes a calibration voltage supply means for providing first and second reference potentials, said first reference potential being connected to said input of said amplifier in lieu of said voltage-representative signal to adjust the value of said control signal such that a sensing current is directed through the resistive heating element.

13. An apparatus as set forth in claim 12, wherein said calibration means includes a counting circuit means which operates to supply said first variable gain amplifier circuit with a progressively increasing binary signal which adjusts the gain of said first variable gain amplifier circuit, said calibration means also including a comparator means connected to receive said second reference potential from said calibration voltage supply means and said output signal from said first variable gain amplifier circuit for generating a stop signal which stops the operation of said counting circuit means to lock the value of said binary signal at that point into said first variable gain amplifier circuit when said output signal from said first variable gain amplifier circuit equals said second reference potential.

14. An apparatus as set forth in claim 6, including a logic circuit means for initiating said calibration sequence.

15. An apparatus as set forth in claim 14, wherein said logic circuit means includes a slope detector means for measuring the slope of said current-representative signal in order to ascertain when the resistive heating element is at the ambient temperature.

16. An apparatus as set forth in claim 5, wherein said logic circuit means includes a logic gating means connected to said slope detector means for initiating said calibration sequence when the resistive heating element is at the ambient temperature.

* * * * *